(12) United States Patent  
Willcocks et al.

(10) Patent No.: US 7,223,428 B2  
(45) Date of Patent: May 29, 2007

(54) METHOD OF EMBOSSING CHOCOLATE PRODUCTS

(75) Inventors: Neil A. Willcocks, Columbia, NJ (US); Frank W. Earis, Maidenhead (GB); Thomas M. Collins, Nazareth, PA (US); Ralph D. Lee, Hampton, NJ (US); William Harding, Gloucester (GB); Steven D. Stephens, Greenville, MS (US)

(73) Assignee: Mars Incorporated, McLean, VA (US)

( * ) Notice: Subject to any disclaimer, the term of this patent is extended or adjusted under 35 U.S.C. 154(b) by 284 days.

(21) Appl. No.: 10/108,478

(22) Filed: Mar. 29, 2002

(65) Prior Publication Data

US 2002/0176918 A1 Nov. 28, 2002

Related U.S. Application Data

(62) Division of application No. 09/341,429, filed as application No. PCT/US98/00658 on Jan. 9, 1998, now Pat. No. 6,406,733.

(51) Int. Cl.
*A23G 3/50* (2006.01)
*A23P 1/00* (2006.01)

(52) U.S. Cl. ...................... 426/383; 426/660
(58) Field of Classification Search ............... 426/383, 426/512, 305, 306, 327, 103, 89, 518, 249, 426/524, 660
See application file for complete search history.

(56) References Cited

U.S. PATENT DOCUMENTS

| 1,522,738 A | 1/1925 | Miller |
| 1,649,307 A | 11/1927 | Hunter |
| 1,656,590 A | 1/1928 | Longstreth et al. |
| 1,880,118 A | 9/1932 | Allyn |
| 1,891,230 A | 12/1932 | Harnden |
| 1,931,409 A | 10/1933 | Humphrey ................ 107/54 |
| 2,191,268 A | 2/1940 | Zeun |
| 2,304,494 A | 12/1942 | Cahoon ..................... 107/4 |
| 2,353,594 A | 7/1944 | Seagren ..................... 41/33 |
| 2,384,077 A | 9/1945 | Crosley et al. |
| 3,184,315 A | 5/1965 | Wolf |
| 3,251,319 A | 5/1966 | Kaupert et al. |
| 3,303,796 A | 2/1967 | Novissimo ................ 107/54 |
| 3,590,749 A | 7/1971 | Burns et al. |
| 3,852,494 A | 12/1974 | Williamson ............... 426/383 |
| 4,183,968 A | 1/1980 | Beckers et al. ............ 426/512 |
| 4,229,484 A | 10/1980 | Steels et al. |

(Continued)

FOREIGN PATENT DOCUMENTS

| EP | 0589820 | 3/1994 |
| GB | 2070501 | 9/1981 |
| WO | 94/07375 | 4/1994 |
| WO | 95/32633 | 12/1995 |

OTHER PUBLICATIONS

Whetstone, H., "Moulds and Moulding: Examples and Techniques", 50th P.M.C.A. Production Conference (1996) pp. 100-106.*

(Continued)

*Primary Examiner*—Arthur L. Corbin
(74) *Attorney, Agent, or Firm*—Fitzpatrick, Cella, Harper & Scinto

(57) ABSTRACT

Methods of producing shaped, embossed, or decorated confectionery chocolate products by using chilled forming, shaping, or embossing devices.

20 Claims, 7 Drawing Sheets

U.S. PATENT DOCUMENTS

| | | | |
|---|---|---|---|
| 4,275,083 A * | 6/1981 | Colten et al. | 426/96 |
| 4,335,147 A * | 6/1982 | Sollich | 426/295 |
| 4,353,927 A | 10/1982 | Lovercheck | 426/101 |
| 4,413,461 A | 11/1983 | Waldstrom | |
| 4,426,402 A | 1/1984 | Kaupert | 426/515 |
| 4,450,179 A | 5/1984 | Vink | |
| 4,455,320 A | 6/1984 | Syrmis | 426/383 |
| 4,460,611 A | 7/1984 | Suzuki | |
| 4,480,974 A | 11/1984 | Akutagawa | |
| 4,501,544 A | 2/1985 | Akutagawa | |
| 4,592,916 A | 6/1986 | Akesson | |
| 4,648,829 A | 3/1987 | Cattani | 425/326.1 |
| 4,668,521 A * | 5/1987 | Newsteder | 426/87 |
| 4,847,090 A | 7/1989 | Della Posta et al. | 424/440 |
| 4,946,696 A | 8/1990 | Nendl et al. | 426/383 |
| 4,979,720 A | 12/1990 | Robinson | |
| 5,248,513 A | 9/1993 | Daouse | |
| 5,391,387 A | 2/1995 | Peters | |
| 5,409,722 A | 4/1995 | Binley | |
| 5,439,695 A | 8/1995 | Mackey | |
| 5,443,856 A | 8/1995 | Akutagawa et al. | |
| 5,449,281 A | 9/1995 | Dupart et al. | |
| 5,514,390 A | 5/1996 | Aasted | 426/231 |
| 5,620,721 A | 4/1997 | Delande et al. | |
| 5,635,230 A | 6/1997 | Aasted | 426/138 |
| 5,650,087 A | 7/1997 | Gram | |
| 5,705,217 A | 1/1998 | Aasted | 426/512 |
| 5,795,610 A | 8/1998 | London | |
| 5,843,512 A | 12/1998 | Daouse et al. | |
| 5,861,185 A | 1/1999 | Capodieci | |
| 5,895,682 A | 4/1999 | Tsukioka | |
| 5,902,621 A | 5/1999 | Beckett et al. | |
| 5,948,456 A | 9/1999 | Jones et al. | |
| 6,056,982 A | 5/2000 | Oshima | |
| RE36,937 E | 10/2000 | Mackley | |
| 6,159,520 A | 12/2000 | Aasted | |
| 6,165,531 A | 12/2000 | Harding et al. | |
| 6,180,152 B1 | 1/2001 | Yoon | |
| 6,217,927 B1 | 4/2001 | Suttle et al. | |
| 6,242,028 B1 | 6/2001 | Bean | |

OTHER PUBLICATIONS

Minifie, B.W., Chocolate and Confectionery, 34d ed. (1989) pp. 100-109, 183, 195, 198-206 and 218.

Aasted, A., "Frozen Cone Technology", The Manufacturing Confectioner, pp. 75-78 (May 1997).

\* cited by examiner

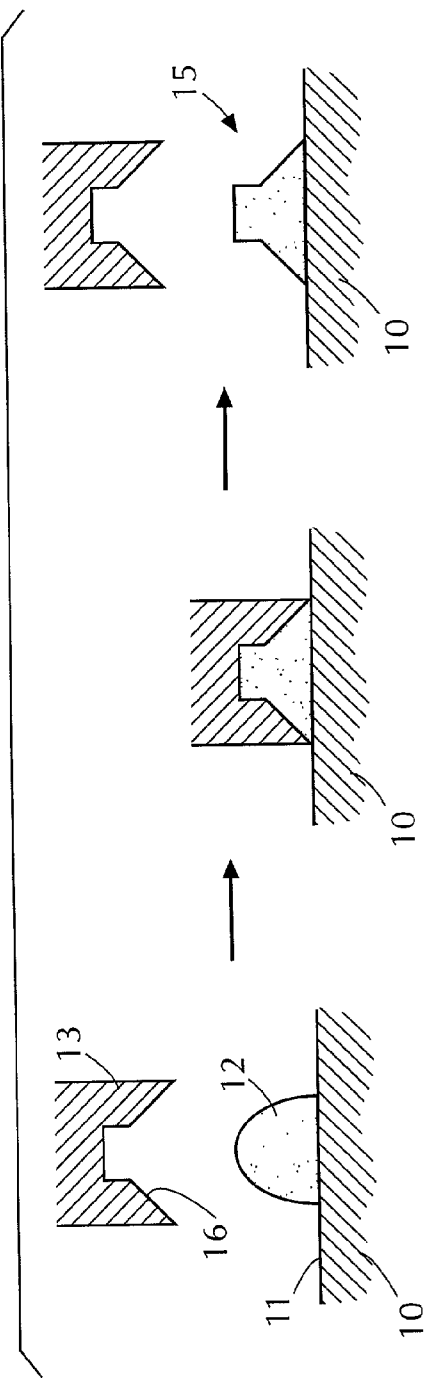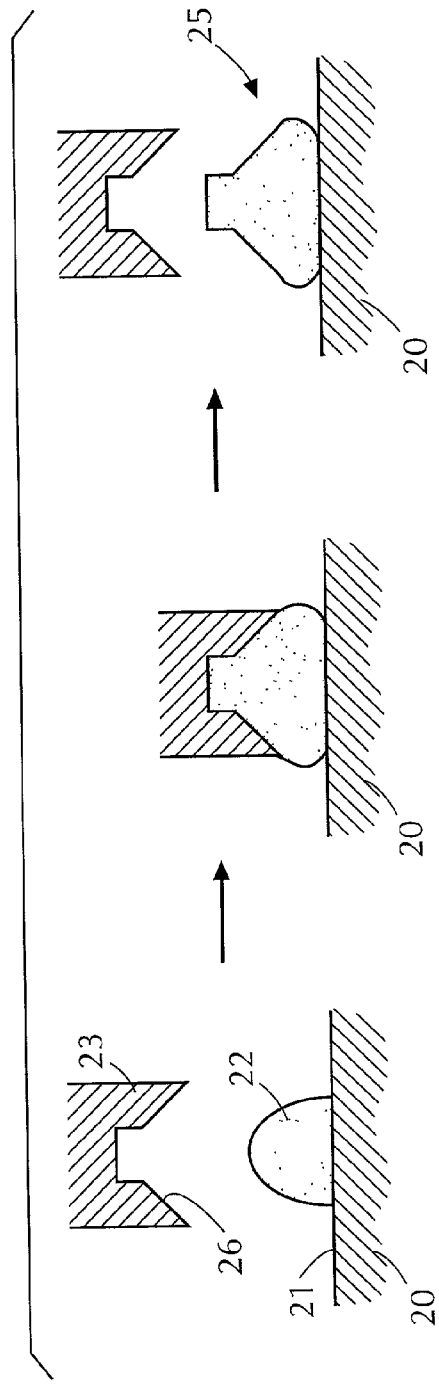

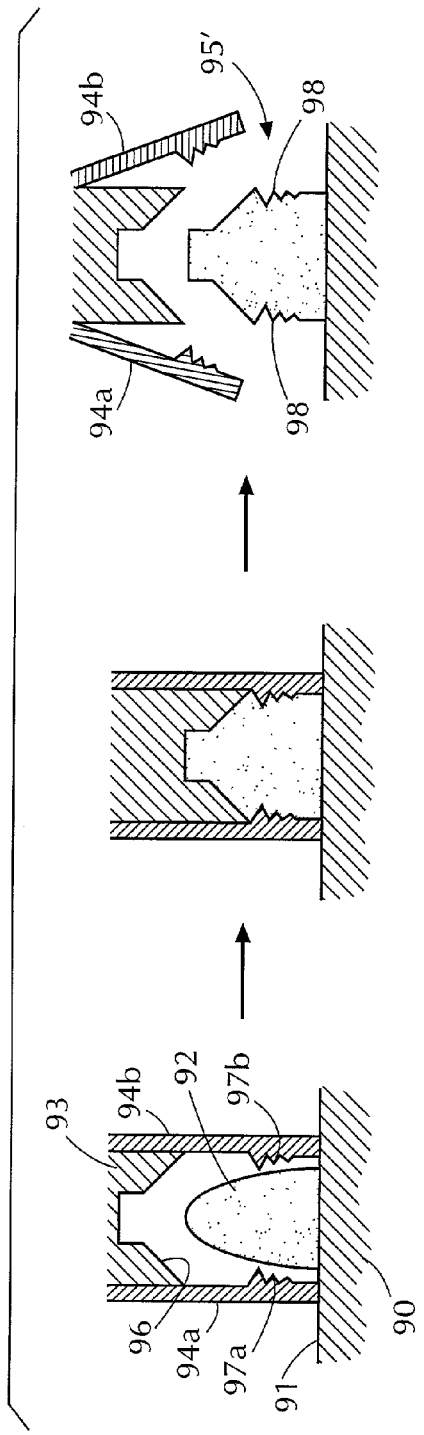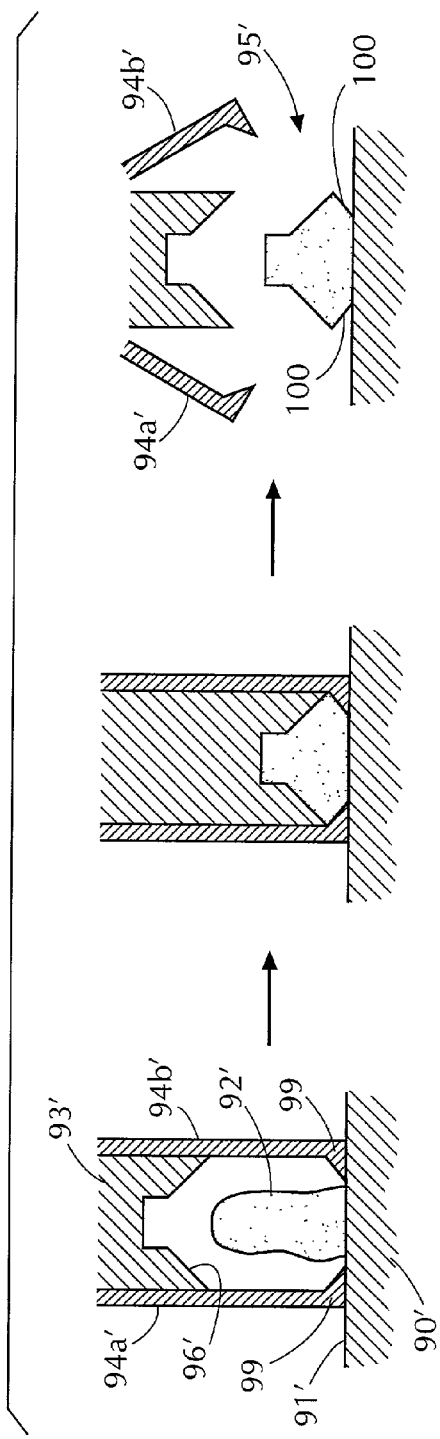

METHOD OF EMBOSSING CHOCOLATE PRODUCTS

This application is a divisional of U.S. Application No. 09/341,429, filed Jan. 6, 2000, now U.S. Pat. No. 6,406,733, which was a 35 U.S.C. § 371 of International Application No. PCT/US98/00658, filed Jan. 9, 1998, and which claims the benefit of U.S. Application No. 08/782,901, filed Jan. 11, 1997, now abandoned.

BACKGROUND OF THE INVENTION

1. Field of the Invention

The present invention relates to methods of forming shaped or embossed chocolate compositions that can include detailed designs and/or planar surfaces.

2. Related Background Art

The unique flavor and mouthfeel of chocolate is a result of the combination of numerous components as well as the process of manufacture. Chocolate contains solid particles dispersed throughout a fat matrix (the term "fat" includes cocoa butter and milk fat).

Similarly, chocolate-like compositions may also contain fats other than cocoa butter or milk fat. Accordingly, melted chocolate and chocolate-like compositions are suspensions of non-fat particles (e.g., sugar, milk powders and cocoa solids) in a continuous liquid fat phase. The fat phase of milk chocolate, for example, is typically a mixture of cocoa butter, a suitable emulsifier, and milk fat. Cocoa butter is typically the predominant fat in the chocolates.

Cocoa butter is a polymorphic material in that it has the ability to crystallize in a number of different crystal packing configurations (Wille and Lutton "Polymorphism of Cocoa Butter", *J. Amer. Oil Chem. Society*, Vol. 43 (1966) pages 491–96, herein incorporated by reference in its entirety). Six different polymorphic forms are generally recognized for cocoa butter. Forms I and II are produced, for example, by rapidly cooling melted untempered chocolate to low temperatures and are very unstable with low melting points. Forms III and IV melt at higher temperatures than Forms I and II but are not the most desirous forms for confectionery manufacture. Forms V and VI are the most stable forms of cocoa butter. It is desirable to have Form V as the predominant form in a well-tempered chocolate. Form V transforms slowly into Form VI after a period of time. Accordingly, chocolate processing is strongly linked to the crystallization and polymorphic behavior of the fat phase. Before chocolate can be satisfactorily processed from liquid to solid using conventional methods, it must be tempered after which it is gently cooled to form a set chocolate having a stable fat phase.

The most commonly used method of processing chocolate involves the following sequential steps:

A. complete melting of the chocolate fat phase;
B. cooling to the point of initial crystallization of the fat phase (i.e., below the melting point of the liquid fat phase);
C. crystallizing a portion of the liquid fat phase;
D. slight heating to melt out any unstable crystals that may have formed leaving from about 3 to 8 wt % as seeds for crystallizing the remaining liquid fat; and
E. gently cooling to set the chocolate, typically in a cooling tunnel.

During conventional chocolate processing, the chocolate mixture is initially melted at temperatures of about 45° C. and tempered by cooling with agitation to about 29° to 30° C. The tempering of the chocolate results in a chocolate dispersion having fat crystals dispersed throughout the liquid fat phase. The chocolate suspension may then be further processed prior to setting by, for example, enrobing the chocolate onto an edible center or molding the chocolate. The chocolate is finally set into a form sufficiently solid for wrapping by gentle, controlled cooling.

Conventional tempering is the controlled partial precrystallization of the fat phase which is believed to be necessary to produce a stable solid form of the fat in the finished product. Therefore, one important object of tempering is to develop a sufficient number of stable seed crystals so that under appropriate cooling conditions the fat phase of the chocolate is able to crystallize into a stable polymorphic form. Tempering plays a key role in ensuring that the cocoa butter crystallizes in the stable form. "Chocolate must be properly tempered. Undertempered chocolate causes delayed setting in the cooler and adhesion to [processing equipment such as a] conveyor belt, and ultimately bad chocolate color and fat bloom" (see *Chocolate, Cocoa and Confectionery: Science and Technology*, by Minifie, 3rd Ed., p. 218, herein incorporated by reference in its entirety).

Although it is important that the chocolate is well seeded with stable forms of cocoa butter crystals, the tempered chocolate still contains a high proportion of liquid cocoa butter, estimated from about 92 to 97 wt % of the fat phase. This must be solidified or at least partially solidified in the cooling process so that the set chocolate can be wrapped and ultimately be completely solidified into a stable crystalline form. (see *Chocolate, Cocoa and Confectionery: Science and Technology*, by Minifie, 3rd Ed., p. 195, herein incorporated by reference in its entirety).

Chocolates having a desired three-dimensional shape or having an image or design imprinted on a surface (herein referred to as "formed chocolates") are conventionally produced by molding. Molding is the casting of liquid chocolate into molds (plastic or metal) followed by cooling and demolding. The finished chocolate may be a solid block, a hollow shell, or a shell filled with a confectionery material such as fondant, fudge or soft caramel (*Chocolate, Cocoa and Confectionery: Science and Technology* by Bernard W. Minifie, Third Edition, page 183, herein incorporated by reference in its entirety).

The term molding includes methods wherein chocolate is deposited into molds, allowed to cool and hardened into solid pieces. The chocolates used in molding processes usually can be somewhat more viscous than coating chocolates since the chocolate can be vibrated and/or forced into a mold over a longer period of time than allowed in enrobing, for example. However, chocolate molded with food inclusions generally must be as fluid as coating chocolates.

Formed chocolate products are conventionally produced by depositing tempered chocolate having a liquid fat phase into molds, allowing the chocolate to cool and harden into solid pieces before demolding the chocolate (*Chocolate, Cocoa and Confectionery: Science and Technology* by Bernard W. Minifie, Third Edition, pages 198–206, herein incorporated by reference in its entirety).

The most commonly used method of producing a shaped chocolate involves the following sequential steps:

A. heating the chocolate to soften, i.e., melting of the fat phase;
B. tempering the chocolate;
C. depositing the tempered chocolate into a mold;

D. shaking the mold to remove air bubbles and fully distribute the chocolate in the mold cavity;

E. cooling to harden the chocolate; and

F. removing said set shaped chocolate from said mold ("de-molding").

One disadvantage of the conventional molding process is the excessive time required to fill the mold, shake the mold to remove air pockets and solidify the chocolate to form a shaped piece. The molding time typically exceeds 10 to 20 minutes. The requirement of the use of molds to form shaped or decorated products greatly reduces the efficiencies of such commercial production lines.

The decoration or embossing of a surface of a chocolate, typically the top surface, by conventional methods is also disadvantageous. In the hand-dipping days, decorations were made by hand using hand tools (*Industrial Chocolate Manufacture and Use* by S. T. Beckett, second edition, page 227, herein incorporated by reference in its entirety). The Sollich Decormatic [Sollich GMBH &Co., KG, Bad Salzuflen, Germany] and Woody Stringer [Woody Associates, Inc., York, Pa., USA] are two conventional decorating apparatuses. The Decormatic decorates the chocolate by applying additional chocolate through a nozzle. The decoration is limited by the movement of the nozzles in relation to the chocolate product (i.e., circulatory or oscillating movements). The Woody Stringer also functions by applying additional chocolate onto the chocolate product to form a decoration. Such devices are limited to the speed in which the additional decorative chocolate can be applied. Moreover, the types of decorations that can be created are limited to those which are able to be formed with the chocolate applicator. These types of devices cannot be used to form the chocolate product into a particular shape or provide a chocolate having an image embossed on at least one surface.

There are a variety of methods in the prior art to decorate chocolate surfaces. U.S. Pat. No. 4,946,696 to Nendl et al. relates to the creation of fine patterns in chocolate surfaces using offset printing of a colored cocoa butter pattern on a printing sheet and thereafter embedding it in a molded chocolate surface. U.S. Pat. No. 4,668,521 to Newsteder relates to a process for producing a photographic quality likeness of a photographic image on the surface of a chocolate candy. The method involves the use of a film surface of a photorelief imaged in a photosensitive element such that peaks and valleys are created in the photosensitive element corresponding to the selected image. A deformable transfer blanket is cast against the photosensitive element surface to record in a surface of the transfer blanket peaks and valleys corresponding to the selected image. A chocolate material is then cast against the surface of the transfer blanket to record the selected image by peaks and valleys in the surface of the chocolate. U.S. Pat. No. 4,455,320 to Syrmis relates to a method for sculpting a person's face from a photograph onto a chocolate candy by adapting a photographic image of a person's face, converting the adapted image into a transfer medium or die and then embossing such adapted image onto chocolate candy.

U.S. Pat. No. 4,183,968 to Beckers relates to a method and apparatus for continuously stamping pieces of candy from travelling lengths of confectionery material and comprises rotating laterally open chambers into which is arranged to project, from opposite sides thereof, axially disposed co-rotating stamping dies. U.S. Pat. No. 3,303,796 to Novissimo relates to a method for continuously forming three-dimensional confectionery shapes in sheet form by a roll-pressing operation. U.S. Pat. No. 2,304,494 to Cahoon relates to candy-forming machines for continuously molding confectionery products.

U.S. Pat. No. 1,522,738 to Miller relates to the production of candy in the form of strips which are substantially rectangular in cross-section. The above U.S. patents are herein incorporated by reference in their entirety.

U.S. Pat. No. 4,648,829 to Cattani relates to a device for shaping ice creams and food articles that have a thick and creamy nature comprising at least one forming unit including an air-pervious contoured die and drive elements for moving the die, and members operative to supply compressed air to the die from the opposite side thereof to that engagable to articles to be shaped. U.S. Pat. No. 4,847,090 to Della Posta et al. relates to improved confectionery products which are characterized in having a single product body of discrete component parts at least certain of which differ from others in respect to their physical and/or chemical properties. A co-extruded confection product may be shaped via the use of opposed forming dies. The above U.S. patents are herein incorporated by reference in their entirety.

The above-identified methods of forming shaped chocolate products or chocolate products having an embossed surface are slow and lack efficiency. When compared to other processing steps in making a chocolate, the molding process is inefficient. While a conventional enrobing line, for example, can operate at up to 10,000 pieces/minute, molding lines can only operate at about 2,000 pieces/minute for molding pieces of similar widths, sizes and shapes. Molding produces, however, desirable properties such as high gloss and detail not attainable by other methods. Such inabilities of other processes to provide an acceptable gloss and the high detail comparable to that provided by a molded product, without the use of a mold, reduces the commercial efficiencies of conventional chocolate processing facilities. It would be desirable to provide a method of making such products in a more efficient manner.

Some known methods have incorporated the use of chilled molds or chilled plunging devices to set chocolate products more rapidly. However, the known methods utilizing molds still require the time consuming steps of (i) shaking the mold to remove air bubbles and to distribute the chocolate in the mold, as well as (ii) setting the chocolate in the mold to allow for de-molding. Moreover, the use of chilled molds by prior methods results in chocolate products having poor gloss. The following references relate to methods of using chilled molds or molds with chilled plungers.

PCT Patent Publication WO 95/32633 to Aasted relates to a method for producing molded shells of fat-containing, chocolate-like masses wherein a mold cavity is filled with a mass and a cooling member having a temperature below 0° C. is subsequently immersed in the mass to define a predetermined shell volume between the member and the mold cavity. This publication is incorporated by reference herein in its entirety.

U.K. Patent publication GB 2 070 501 relates to making confections, such as chocolates and the like, of substantially uniform size. The method involves the steps of depositing a gob of flowable confectionery substance onto a surface, surrounding the gob in spaced relationship with an annular mold, exerting pressure upon the gob to cause the gob to spread apart and come into contact with the mold causing the gob to set so as to form a confectionery body in the mold and separating the confectionery body and the molds from one another. Pressure is exerted on the gob by a ram. It is advantageous if each of the annular molds has a hollow circumferential wall and if a cooling fluid circulates through this hollow wall to create a cooling channel so as to obtain a rapid chilling (and thus setting) of the gob. The inner circumference of the mold may have any desired regular or irregular shape, depending upon what shape is desired to impose upon the finished confectionery body. This publication is incorporated by reference herein in its entirety.

European Patent Application 0 589 820 to Aasted relates to a method for producing molded outer shells of fat-containing, chocolate-like masses wherein a mold cavity is filled with a tempered chocolate-like mass which solidifies from the mold cavity inwardly to form the outer shape of the shell, the temperature of the mold cavity being lower than the temperature of the tempered mass. The mold cavity is filled with a chocolate-like mass in an amount which is just slightly larger than the volume of the finished shell. A cooling member, which has preferably been cooled to −15 to −30° C., is then immersed into the chocolate mass and kept in a fully immersed position for about 2 to 3 seconds. The chocolate-like mass will then solidify rapidly during crystallization from the cooling member and will readily release the cooling member, which can be lifted up and out of the mold of the cavity. This publication is incorporated by reference herein in its entirety.

PCT Patent Publication WO 94/07375 to Cebula et al. relates to forming fat-containing products such as chocolate in molds at temperatures at or below 0° C. to provide unforced demolding. This publication is incorporated by reference herein in its entirety.

U.S. Pat. No. 4,426,402 to Kaupert relates to a method and an apparatus for producing chocolate forms using molding tools. During an injection step, the molding tool is cooled with a coolant, wherein one of the molding parts is maintained at about 20° C., while the other is maintained at a substantially lower temperature of 0° C. or less, such as about −5° C. Even lower temperatures, such as −10° C. and even −20° C., are disclosed as acceptable for still faster molding speeds if the formed chocolate body is carefully handled. This U.S. patent is incorporated by reference herein in its entirety.

The above-identified references fail to teach or suggest forming, shaping, or embossing methods to produce embossed or highly detailed and highly reproducible decorated chocolates having acceptable gloss with the efficiency and speed of an enrobing line. Thus, the development of methods which increase the speed and efficiencies of shaped chocolate processing lines would be a valuable addition to the art and offer alternate manufacturing methods.

The above-identified references also fail to teach or suggest that it is possible to emboss highly intricate details onto the tops of enrobed products. A method to add reproducible fine details to an enrobing process is not currently available. Thus, the development of methods which enable the convenient inclusion of highly intricate designs on the surfaces of enrobed products would be a valuable addition to the art and offer expanded opportunities for manufacture and design.

SUMMARY OF THE INVENTION

The invention relates to a method of producing shaped, formed, embossed, or decorated confectionery chocolate products using a chilled forming, shaping, or embossing device. According to one aspect of the invention, a chocolate composition is deposited onto a surface and the chilled device is brought into contact with a surface of the chocolate composition to at least partially solidify the contacted surface. According to one embodiment, a chilled former/shaper or embosser is brought down and contacted with a chocolate composition containing a liquid fat phase to solidify the contacted chocolate mass into a form sufficiently solid to retain the desired shape/form and/or with the desired image or design embossed on the contacted surface. The chocolate may be first deposited onto a surface (i.e., conveyor belt) or enrobed onto an edible center and subsequently contacted with the chilled forming/shaping or embossing device to form the formed/shaped or embossed chocolate product.

According to another embodiment, the chocolate is first enrobed onto an edible product and a surface of the enrobed edible product is contacted with a chilled embossing device to form an image or design on the contacted surface and subsequently set in a cooling chamber. Other enrobed edible products such as caramel, nougat, etc. may also be produced. Moreover, multi-component food products may be formed. For example, two different materials may be co-extruded or co-deposited onto a deposition surface with one component (i.e., chocolate) surrounding the second component and subsequently shaped/formed or embossed with the chilled device to form a shaped product having an inner component and an outer component.

Another aspect of the invention relates to the ability to provide an acceptably glossy chocolate product using a chilled forming/shaping or embossing device. One embodiment relates to controlling the contacting time of the chilled device with the chocolate surface to allow the inner warmer portions of the chocolate mass to assure that fat is adequately expressed across the surface, contributing to the preparation of products with acceptable gloss.

Factors that affect the gloss of the chocolate mass are (i) the contact time with the forming/shaping or embossing device, (ii) the temperature of the forming/shaping or embossing device, and (iii) the rewarming process caused by internal and external heat. The above factors affect the surface temperature thereby affecting the fat expression on the surface and consequently, the preparation of a product with acceptable gloss.

Accordingly, another embodiment relates to the use of a subsequent warming zone after the chilled contracting step to allow fat to express on the surface. Yet another embodiment relates to the use of a forming cavity coated with material which improves the wetting properties of the chocolate, thereby affecting its gloss. A still further embodiment involves the heating of the cavity to improve wetting properties to affect the gloss. A still further embodiment relates to the use of seeded chocolate having higher temperatures at the time of being contacted with the chilled device to provide better wetting of the chilled device and/or better fat expression on the surface.

Yet another aspect of the invention relates to improved methods of making formed chocolates using seed agents that eliminates the dramatic increases in viscosity typically associated with tempered chocolate. The invention also relates to the ability to process chocolates at higher temperatures without the need to temper at low temperatures providing even further improved Theological properties.

The use of seeding agents to provide temper without initiating the crystallization of the liquid fat phase that occurs during conventional tempering provides a chocolate composition that is easier to form/shape or emboss into a formed/shaped or embossed product. Preferably, the use of seeding agents according to the invention actually postpones the crystallization of the fat phase. This enables the seeded chocolate to be used in shaping/forming or embossing applications that require lower viscosities. The use of the seeded compositions in such applications allows for the manufacture of high quality products such as shaped/formed or embossed products having finer details with lower fat contents.

BRIEF DESCRIPTION OF THE DRAWINGS

FIG. 2 is a schematic sectional side view of a forming method according to an embodiment of the present invention.

FIG. 3 is a schematic sectional side view of a forming method according to an embodiment of the present invention.

FIG. 10A is a schematic sectional side view of a forming method according to an embodiment of the present invention.

FIG. 10B is a schematic sectional side view of a forming method according to an embodiment of the present invention.

DETAILED DESCRIPTION OF THE INVENTION

Definitions

Figure 1A:
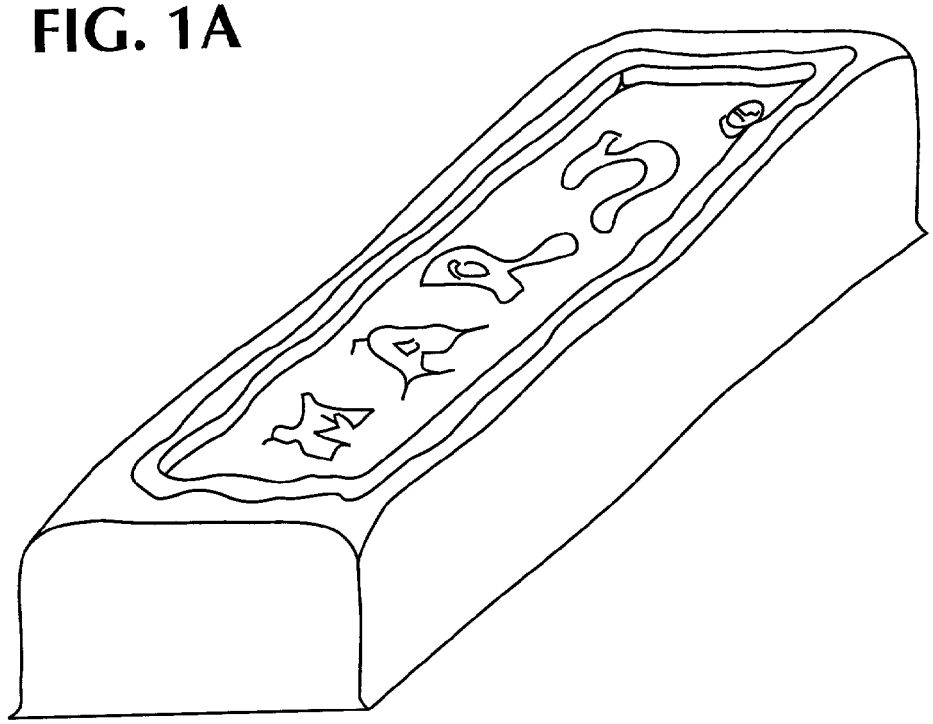
FIG. 1(a) is a top side elevational perspective view of a chocolate confection having a detailed embossed image formed on a top surface according to one embodiment of the present invention.

1.

The term "chocolate" is intended to refer to all chocolate or chocolate-like compositions with a fat phase or fat-like composition. As the invention is directed to the control of the characteristics of the fat or fat-like phase of the chocolate, rather than the non-fat materials within the chocolate, the term is intended to include all chocolate and chocolate-like compositions. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise.

The fat phase of the chocolate of the present invention can include cocoa butter, milkfat, anhydrous milkfat, butteroil, hydrogenated or partially hydrogenated vegetable oils or fats (fractionated or unfractionated) and other fats or mixtures of cocoa butter with these other fats. See Minifie, *Chocolate Cocoa and Confectionery Science and Technology* 3rd Ed. pages 100–109.

In the United States, chocolate is subject to a standard of identity established by the U.S. Food and Drug Administration (FDA) under the Federal Food, Drug and Cosmetic Act. Definitions and standards for the various types of chocolate are well established in the U.S. Nonstandardized chocolates are those chocolates which have compositions which fall outside the specified ranges of the standardized chocolates.

Chocolates also include those containing crumb solids or solids fully or partially made by a crumb process.

Nonstandardized chocolates result when, for example, the nutritive carbohydrate sweetener is replaced partially or completely; or when the cocoa butter or milkfat are replaced partially or completely; or when components that have flavors that imitate milk, butter or chocolate are added or other additions or deletions in formula are made outside the USFDA standards of identify of chocolate or combinations thereof.

2.

The term "chocolate confection" refers to chocolate products that are stable at ambient temperatures for extended periods of time (i.e., greater than 1 week). These products are characterized as microbiologically shelf-stable at 65°–85° F. under normal atmospheric conditions. The term "confection" is not intended to include ice cream products or other products that are typically stored at temperatures below 0° C. and which are designed to be consumed while in a frozen state. As a confection, chocolate can take the form of solid pieces of chocolate, such as bars or novelty shapes, and can also be incorporated as a component of other, more complex confections where chocolate is combined with and generally coats other foods such as caramel, nougat, fruit pieces, nuts, wafers or the like. Other complex confections result from surrounding soft inclusions such as cordial cherries or peanut butter with chocolate and other complex confections result from coating ice cream or other frozen or refrigerated desserts with chocolate. However, chocolate coatings on ice cream or other frozen products typically do not contain stable fat crystals and are not included in the present invention.

3.

The term "chocolate-like compositions" refers to chocolate flavored compositions containing solid particles dispersed in a fat or fat-like phase.

4.

The term "cooled chocolate" refers to a melted chocolate which has been cooled to produce a solid chocolate wherein substantially all of the fat is in a solid state.

5.

The term "crystalline fat" refers to a liquid fat which has been cooled to allow the fat to undergo a phase transition to one or more crystalline forms or polymorphs. For example, cocoa butter may crystallize as any one of six recognized polymorphs.

6.

The term "set chocolate product" refers to a product in which sufficient fat has solidified at a given temperature to provide the product with a minimum degree of physical integrity, such that its shape and appearance are maintained at the given temperature.

7.

The term "fats", as used herein, refers to triglycerides, diglycerides and monoglycerides that can normally be used in chocolates and chocolate-like products. Fats include the naturally occurring fats and oils such as cocoa butter, pressed cocoa butter, expeller cocoa butter, solvent extracted cocoa butter, refined cocoa butter, milkfat, anhydrous milkfat, fractionated milkfat, milkfat replacers, butterfat, fractionated butterfat, hydrogenated or partially hydrogenated vegetable fats or oils (fractionated or unfractionated), modified vegetable fats and synthetically modified fats such as Caprenin®.

8.

The term "chocolate setting temperature" refers to the temperature to which a chocolate composition must be cooled to produce a "set chocolate product".

9.

The term "chocolate melt temperature" refers to the temperature of a chocolate composition comprising a liquid fat phase. This temperature can range from the "chocolate setting temperature" up to any higher temperatures typically encountered in chocolate processing. Conversely, "chocolate melting temperature" would refer to the temperature at which point the fat phase is completely melted.

10.

The term "chocolate composition comprising a liquid fat phase" refers to a chocolate or chocolate-like composition where the fat phase is liquid or partially liquid.

11.

The term "force sufficient to cause flow" refers to the force or more properly the stress which must be applied to a chocolate comprising a liquid fat phase to cause it to flow at a finite shear rate. The applied stress must be sufficient to overcome the yield stress of the chocolate. Such force may be applied during a number of different chocolate processing operations such as spraying, atomization, injection molding, pouring, enrobing, extrusion, shaping, spin molding, pumping, dripping, depositing, molding or combinations thereof.

12.

The term "continuous fat phase" refers to the fat phase of a chocolate which represents the continuous phase into which are dispersed the non-fat particles, added seeding agent particles and any conventionally produced fat seed crystals, where the chocolate in a fluid state is representative of a solid in liquid dispersion.

13.

The term "fat bloom" refers to the uncontrolled recrystallization of fat on the surface of a chocolate product characterized as a grayish coating on the surface of the chocolate.

14.

The term "processing temperature range" refers to the temperature range between the chocolate solidification temperature and the seed melting temperature.

15.

The term "seeded chocolate" refers to a chocolate comprising a liquid fat phase to which a seeding agent has been added.

16.

The term "stable fat crystals" refers to those crystalline forms or polymorphs that are stable at higher temperatures; that is, these polymorphs have higher melting points. For cocoa butter, six crystal polymorphs have been recognized and characterized by both thermal analysis and X-ray diffraction. These six forms are well known to those skilled in the art of chocolate manufacture (see Wille et al., "Polymorphism of Cocoa Butter", J. Am. Oil Chem. Soc., Vol. 43 (1966) pages 491–96). Referring to cocoa butter then, the term "stable fat crystals" is meant to include the form V and form VI polymorphs which melt at higher temperatures. The term "unstable fat crystals" refers to the remaining lower melting lower polymorphs.

17.

The term "temper" refers to the presence of stable fat crystals in a chocolate. The degree or level of temper in a chocolate can be measured by commercially available instruments which characterize the behavior of a chocolate sample during controlled cooling. An example of this type of instrument is the Tricor Tempermeter [Tricor Instruments, Elgin, Ill.] which in its standard embodiment, determines chocolate temper during a 5 minute controlled cooling test. Specifically, the Tricor Tempermeter detects and measures an inflection point in a temperature versus time curve or trace. The units of temper, using the Tricor Tempermeter, may be expressed as chocolate temper units (CTU) and/or as a slope measurement. CTU measurements can be expressed in either Fahrenheit or Celsius temperature scale terms. All CTU measurements herein referred to herein are in the Fahrenheit scale, unless otherwise specified. Fahrenheit CTU measurements can be converted to Celsius scale by dividing by a factor of 1.8. Higher CTU values and lower slope values correspond with higher levels of temper. If there is no detectable inflection in the 5 minute trace, the chocolate would typically be assessed as having no temper.

18.

The term "low temper" refers to temper which cannot be detected i.e., no inflection, with a Tricor Tempermeter during a 5 minute trace, but which can be measured with a Tricor Tempermeter which has been modified to perform a 9.5 minute trace. The units of measurement are the same as used for the measure of "temper". If there is no detectable inflection in the 9.5 minute trace, i.e., the longest test time currently available with a Tricor unit, the chocolate would then be described as having no temper. However, it is nonetheless possible for such chocolates to have temper.

To measure temper levels below this limit, a method was developed using a rotational rheometer, in this case a CarriMed Controlled Stress Rheometer Model CSL 500. By performing controlled cooling and shearing tests it is possible to compare the onset temperature of crystallization for chocolate with no inflection in a 9.5 minute trace to the onset temperature for the same chocolate which has been heated prior to analysis to ensure a true no temper condition. This difference in onset temperature is defined as a Rheological Temper Unit (RTU). The range of temper between truly no temper chocolate and the lowest level measurable in a 9.5 Tricolor Tempermeter minute trace with a Tricor Tempermeter is defined as ultra-low temper. A more detailed description of the technique is given below.

19. Ultra-low temper

The term "ultra-low temper" refers to temper which cannot be detected, i.e., no inflection, with a Tricor Tempermeter during a 9.5 minute trace, but which can be measured using a more sensitive rheological measuring technique as discussed further below. Ultra-low temper is expressed in Theological temper units (RTU). The term is described in more detail in U.S. patent application Ser. No. 08/782,903, filed Jan. 11, 1997 and herein incorporated by reference.

20.

The term "molding" refers to methods wherein chocolate, either plain or mixed with additives such as nuts, raisins, crisped rice and the like is deposited in molds, allowed to cool and hardened into solid pieces. The chocolates used in molding processes usually can be somewhat more viscous than coating chocolates since the chocolate can be vibrated and/or forced into a mold over a longer period of time than allowed in enrobing, for example. However, chocolate molded with food inclusions and/or chocolate used for shell molding generally must be as fluid and sometimes even more fluid as coating chocolates.

21.

"Reduced calorie fat", as used herein, is a fat having all the properties of typical fat but exhibiting less calories than typical fat. An example of a reduced calorie fat is Caprocaprylobehenin, commonly known as Caprenin® [Proctor and Gamble, Inc., Cincinnati, Ohio], as described in U.S. Pat. No. 4,888,196 to Ehrman, et al., which is incorporated herein by reference.

22.

The term "gloss" refers to a physical property which is characteristic of the visual appearance of a chocolate and is very important for consumer acceptance. More specifically, gloss refers to the ability of the surface of a chocolate product to reflect incident light giving a "shiny" or "glossy" appearance. Gloss can be measured in a variety of ways both visually and instrumentally.

The gloss data described herein was determined using the Tricor Glossmeter Model 801A. The products to be measured were held in the holder in the measurement chamber such that the surface to be measured is at the same level relative to the light source and camera for all products. The meter is calibrated prior to each use using the Tricor Gloss standard reference plate which has a defined gloss level of 255. The measurement evaluated is the average gloss of the 5% brightest pixels with a threshold of 1. Typical subjective gloss values as related to Tricor measured gloss values are compared in Table I set forth below:

TABLE I

| Subjective | Gloss Reading |
|---|---|
| Excellent | >190 |
| Good | 175 to 189 |
| Fair | 160 to 174 |
| Min. Acceptable | 150 |
| Poor | 149 and below |

23.

The term "glossy" refers to a chocolate having an acceptable gloss, i.e., not dull, substantially uniform, etc. Although a relatively subjective term, the use of the term is well known to those skilled in the art.

24. Viscosity. Chocolate displays non-Newtonian rheology and cannot be totally characterized by a single rheological measurement point. Despite this, apparent viscosity is a simple measure of viscosity useful for the evaluation of tempered and untempered chocolates and their suitability for operations such as enrobing and molding. The measurement of apparent viscosity can be accomplished by many methods. The method used herein for apparent viscosity measurements is as follows: The chocolate is maintained at the desired measurement temperature. The viscosity is measured using a Brookfield viscometer Model RV [Brookfield Co., Brookfield, Md.] equipped with a "B" size T-spindle (approximately 36.4 mm cross-bar) and operating at 4 RPM. The spindle is immersed in the chocolate to be measured and allowed to rotate three times. The reading is taken after the third rotation and multiplied by 1000. The resultant value is the apparent viscosity in centipoise.

25.

The term "forming" includes decorating, shaping, embossing or any other methods of producing a chocolate having a desired shape, form or appearance.

26.

The term "shape" refers to any three-dimensional forms including cubic shapes, animal shapes, etc.

27. The term "shaped chocolate product" as used herein refers to any discrete chocolate confection, as opposed to a continuous chocolate product such as a web product, a string product, or a connected series of repeating chocolate intermediate units which must be subsequently separated during processing.

28. The term "deposit" as used herein in respect to "depositing onto a surface" refers to any means of causing a mass to be situated on the surface. Such means can include but are not limited to, for example, dropping, extruding, coating, depositing, pouring, co-depositing, dual depositing, and multiple depositing. Multiple depositing includes two or more deposits in sequence, concurrently, or in a combination. Multiple depositing further includes depositing two or more compositions. Multiple depositing, in another sense, also includes depositing two or more units in sequence, concurrently, or in a combination.

29. The term "deposit surface" refers to any surface on which a mass is deposited.

According to the present invention, a shaped/formed or embossed chocolate product is made by contacting a chilled forming, shaping or embossing device onto a mass of at least one surface of a chocolate composition comprising a liquid fat phase to form a set or semi-set (sufficiently solid to maintain shape) chocolate product of a specific shape or having a specific design embossed on the contacted surface. The invention provides the unique ability to make a "molded-type" product on an enrobing line or depositing process. Surprisingly, it has been discovered that a high definition embossed image or intricate or complicated shape can be made using a chilled shaping/forming or embossing device. For example, fine print, or pattern or design can be embossed onto the surface and/or the entire mass shaped into a desired three-dimensional form. Furthermore, it is believed that the formed/shaped or embossed intricate images may be as detailed as photographic or holographic images. In addition, the shaping/forming or embossing can be accomplished rapidly without the use of a mold at advantageously high production rates.

The present invention results in a set product that contains stable fat crystals in the fat phase of the composition. Since the chocolate is typically kept or stored at room temperature, any unstable fat crystals will readily transform to the more thermodynamically stable phases. In contrast, chocolate compositions (typically non-standardized chocolate) are sometimes directly applied onto a frozen product (i.e., ice cream) to form a chocolate enrobed product. These chocolates do not form compositions wherein substantially all the fat is in the stable form since the product is kept frozen and therefore the unstable fat crystals do not transform into the stable forms. In fact, unlike confections stored at room temperature or ambient conditions, the chocolate coatings on frozen products are intended to primarily contain unstable fat crystals to deliver a chocolate composition with low temperature melting characteristics, complimentary to frozen fillings such as ice cream. See PCT WO 94/07375 to Cebula, page 3, lines 11–12.

Therefore, the inventive method preferably results in a set chocolate comprising stable fat crystals and unstable fat crystals. That is, the set chocolate should comprise a fat matrix containing fat crystals of the polymorph Form V, Form VI or mixtures thereof Preferably, the set chocolate results in a finished confection as delivered to the consumer with substantially the same melt profile as a conventionally processed chocolate confection.

Furthermore, another aspect of the invention relates to the ability to provide acceptable gloss with the chilled forming/shaping or embossing device. This is achieved by providing a formed/shaped or embossed chocolate having planar surfaces and/or sharp edges to provide acceptable gloss perception. The gloss of a chocolate product is very important for consumer acceptance.

An interesting comparison can be made with molded chocolate products, which when properly processed are typically considered to be glossier than their enrobed counterparts. According to yet another aspect of the invention, the process parameters are controlled to provide a shaped/formed or embossed product having acceptable gloss. As described above, factors that affect the gloss of a chocolate mass are (i) the contact time with the forming/shaping or embossing device, (ii) the temperature of the forming/shaping or embossing device, and (iii) the rewarming process caused by internal and external heat. Accordingly, the process parameters that affect such factors can be controlled to provide acceptable gloss.

Accordingly, one aspect of the invention relates to controlling (i) the temperature of the chocolate composition, (ii) the temperature of the chilled forming/shaping or embossing device, and (iii) the time of contact and temperature of cooling of the mass after contacting to affect the rewarming of the surface of the chocolate to improve the gloss. One method of achieving this is by contacting the chocolate with the chilled device to the chocolate for a brief period of time (for example, less than 1 second) sufficient to form a very thin skin of solidified chocolate layer thick enough to retain the desired shape. However, since the solidified layer is thin, the inner portion of the chocolate, which is still warm, e.g., around 25° C., is able to warm and potentially partially melt the set skin to an extent sufficient to express fat on the surface without losing the shape or form of the chocolate mass.

One embodiment of the invention relates to controlling the process parameters to provide a solidified skin that is thin enough to allow the inner warm portions of the chocolate mass to warm the surface to an extent that the retracted fat flows without losing the shape of the skin. If the solidified skin is too thick, the inner portion of the chocolate will not warm the solidified outer surface layer to allow the fat to express on the surface. The resultant set surface is likely to have poor gloss. Alternatively, if the solidified skin is too thin, the inner warm portions will warm the solidified skin too much and cause the entire solidified skin to melt and lose its form. The ability to retain the form or detailed decoration of the chocolate and provide acceptable surface gloss is a surprising and unexpected result. By controlling the process parameters, a glossy decorated or shaped chocolate confection can be rapidly produced.

According to another embodiment, the surface of the rapidly shaped/formed or embossed chocolate may be warmed by using external heat by convection and/or radiation to improve the gloss of the rapidly formed/shaped or embossed product.

In one embodiment of the invention, rapid release of the chocolate from the surface of the forming/shaping or embossing device is accomplished by controlling the surface energy of the device. This can be accomplished, as described above, by (i) lowering temperature, (ii) selecting low surface energy materials, or (iii) coating with low surface energy materials as described in U.S. Provisional Application "Improved Molding Process", FCH&S Docket No. 2280.2360, filed contemporaneously, and incorporated herein by reference in its entirety. The term "low surface energy" refers to those surface energy values that promote release, as described in the above referenced application. By lowering the surface energy of the device, the wetting of the surface by the chocolate is reduced. This reduces the adhesive strength of the chocolate to the device relative to the cohesive strength of the chocolate provided by the rapid solidification of the chocolate at the low temperature.

According to one preferred embodiment, the chocolate is deposited onto an edible product, shaken to distribute the chocolate around the top surface of the edible product and subsequently contacted with the chilled shaper/former or embosser to form the shaped/formed or embossed chocolate product.

According to one preferred embodiment, two or more compositions may be co-deposited onto the belt and shaped/formed to form a multi-component food product or filled chocolate product. For example, an edible mass is formed by enrobing or depositing the chocolate composition onto an edible center prior to contacting the edible mass with the chilled forming/shaping or embossing device. The edible center may comprise an edible composition selected from nougat, truffle, peanut butter, caramel, praline, nuts, marshmallow, fudge, puffed grains, cookie, biscuit, wafer, turkish delight, fondants and mixtures thereof. Using the present invention, novel chocolate coated products can be produced since the center portion can be deposited before the chocolate. During conventional methods, a chocolate shell is formed in a mold cavity. The resultant chocolate shell is then filled with an edible mass to form a chocolate coated confection. If the edible mass needs to be maintained at elevated temperature in order for it to flow (i.e., be deposited), it cannot be used as the center of the chocolate confection since it will melt the chocolate after being deposited into the chocolate shell. The present invention provides the advantage of being able to first deposit a highly viscous center at elevated temperatures, cool the deposit mass to a temperature before the solidification temperature of the chocolate, deposit the chocolate onto the cooled mass and finally contact the chocolate coated mass with a chilled former to form a novel high quality molded confection.

According to another preferred embodiment, two or more chocolate or fat-containing compositions are co-deposited side by side in contact with one another and a forming/shaping device is contacted with the composite mass and twisted, spun, twirled or otherwise moved while in contact with the mass to form a spiral or other type of design as a result of the mixing or co-mingling of the two or more compositions. For example, white chocolate and dark chocolate are co-deposited onto a surface to form a mass containing both white and dark chocolate. A chilled former/shaper is contacted with the mass and rotated to form a formed/shaped product having a swirl type design.

Alternatively, a first chocolate composition can be deposited onto a surface and a second chocolate composition sprayed, thinly coated or splattered onto the first chocolate composition to form a composite mass. The chilled former/shaper or embosser can then be contacted with the mass to form an formed/shaped or embossed composite mass.

Another aspect of the invention, relates to an apparatus for contacting the chilled device with the chocolate composition. The apparatus can be located in the enrober, in a transition zone between the enrober and cooling tunnel or within the cooling tunnel. In a preferred embodiment, the apparatus includes a chilled ring-sealing device to contain the chocolate prior to or during application of the chilled former/shaper or embosser.

The operating temperature of the chilled forming, shaping, or embossing device is preferably below about 10° C., advantageously less than 5° C., even better less than 0° C. and still more preferred less than –5° C. Even lower temperatures such as below –10° C., even better below –15° C. and below –20° C. may be used to produce products having even further improved properties.

The rapid setting of the contacted surface occurs in a period of time substantially less than the cooling time of conventional molding methods. Preferably, the contact time of the chilled device onto the chocolate surface is less than 1 minute, advantageously less than 45 seconds, even better less than 30 seconds and most preferred less than 20 seconds. Shorter cooling times such as less than 10 seconds minute or even less than 5 seconds may be used with suitable chocolate compositions.

According to another preferred embodiment, the melted chocolate composition is first enrobed onto an edible product, contacted with a chilled former/shaper or embosser and subsequently rapidly or conventionally cooled to form a set chocolate coating.

Alternatively, the chocolate composition is deposited onto an edible center and/or a conveyor belt or tray or the like, contacted with the chilled former/shaper or embosser and transported into the rapid cooling zone or conventional cooling tunnel. According to another embodiment, the chocolate is contacted with the chilled former/shaper or embosser immediately after entering a cooling tunnel. Furthermore, according to another embodiment the forming/shaping or embossing is accomplished within the tunnel after significant solidification of the chocolate has occurred. In this instance, warming of the surface of the chocolate is carried out by radiative or convective means prior to the inventive forming/shaping or embossing step.

Figure 1B:
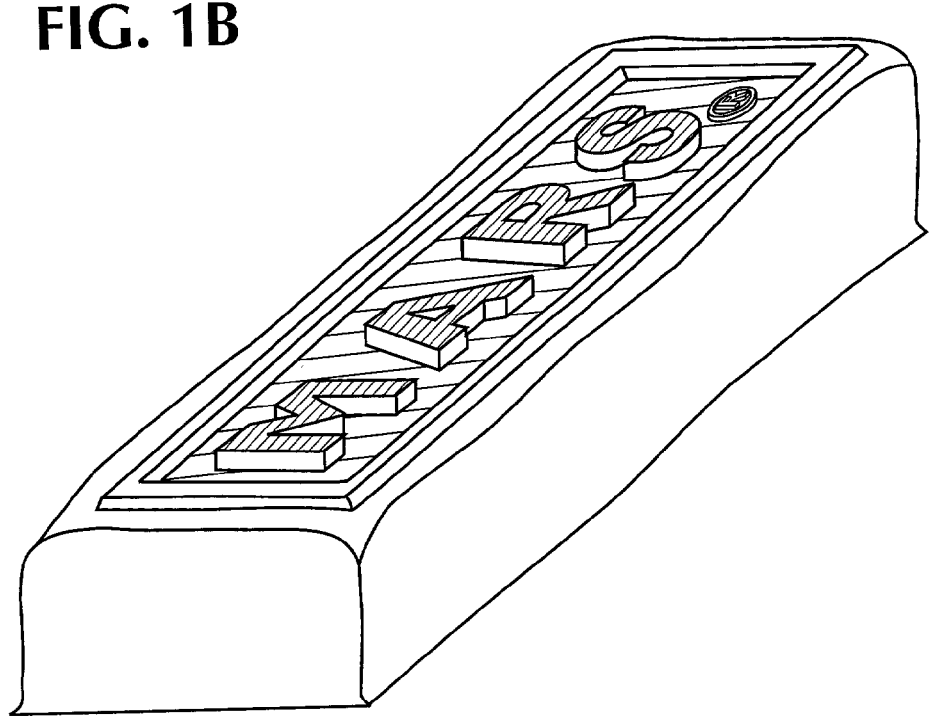
FIG. 1(b) is a top side elevational perspective view of a chocolate confection having a highly detailed improved embossed image on a top surface made according to another embodiment of the present invention using a colder embosser, longer contact time and/or use of subsequent rapid cooling treatment.

Another aspect of the invention relates to the ability to achieve good retention of the shape of the contacted surface using, for example, colder formers/shapers or embossers, longer contact times and/or subsequent rapid cooling treatment. Although the shaped/formed or embossed product can be subsequently cooled by conventional cooling to provide acceptable retention of detail, a preferred aspect of the invention relates to the ability to provide high quality shaped or decorated products using rapid cooling. Conventional cooling may result in less decoration retention (see FIG. 1($a$)), whereas the rapid cooling results in an improved setting of the embossed surface and excellent fine detail retention as a result of the rapid setting of at least the outer surface layer of the product (See FIG. 1($b$)). Either conventional cooling or rapid cooling can be used to set the formed chocolates. According to the present invention, the formed/shaped or embossed products are preferably set by rapid cooling as set forth in application Ser. No. 08/789,902, filed Jan. 11, 1997, and herein incorporated by reference.

Alternatively, using (i) rapid chilled forming/shaping or embossing, and/or (ii) rapid cooling allows for the use low or ultra low temper chocolates. This allows for the use of reduced fat chocolates since the lower temper will provide lower viscosities. The use of low and ultra-low temper and methods of providing chocolates having these temper levels with seeding agents is described in U.S. patent application Ser. No. 08/782,903, filed Jan. 11, 1997, and herein incorporated by reference.

The chocolate composition can either be tempered by conventional methods or seeded with a seeding agent. Another embodiment of the invention relates to the use of seeded chocolates having higher-average mass temperatures at the time of being contacted with the chilled device to provide better wetting of the chilled device and/or a reduction in the retraction of fat at the surface. Various methods of formulating seeded chocolates suitable for use in chilled forming/shaping or embossing according to the invention are described in U.S. patent application Ser. No. 08/782,903.

Rapid forming/shaping or embossing chocolate compositions having higher bulk temperatures allows for contacting with chilled devices to result in a formed/shaped or embossed chocolate product having acceptable surface gloss. The ability to contact chilled devices with a tempered chocolate having a higher temperature enables the hot tempered chocolate to temporarily warm the contacted surface of the chilled device thereby reducing or eliminating the fat retraction from the surface of the device. Moreover, the hot chocolate wets the chilled surface of the device better. The result is the ability to rapidly produce formed/shaped or embossed products having acceptable gloss. As the hot seeded chocolate is contacted with the chilled former/shaper or embosser, the chocolate temporarily warms the contacted surface to provide good wetting. After the seeded chocolate is contacted and wets the chilled forming/shaping or embossing device, the chilled device rapidly solidifies the chocolate mass rapidly forming a glossy shaped/formed or embossed product.

Referring to FIG. 2, according to one embodiment of the present invention, an edible mass 12 is deposited onto a deposit surface 11 of a substrate 10. A forming member 13 having a chilled contacting surface 16 is contacted to edible mass 12, thereby at least partially solidifying an outer surface layer of edible mass 12 to form a shaped edible product 15.

Referring to FIG. 3, according to another embodiment of the present invention, an edible mass 22 is deposited onto a deposit surface 21 of a substrate 20. A forming member 23 having a chilled contacting surface 26 is contacted to edible mass 22, thereby at least partially solidifying an outer surface layer of edible mass 22 to form a shaped edible product 25. In this embodiment, forming member 23 is not brought into contact with deposit surface 21.

Figure 4:
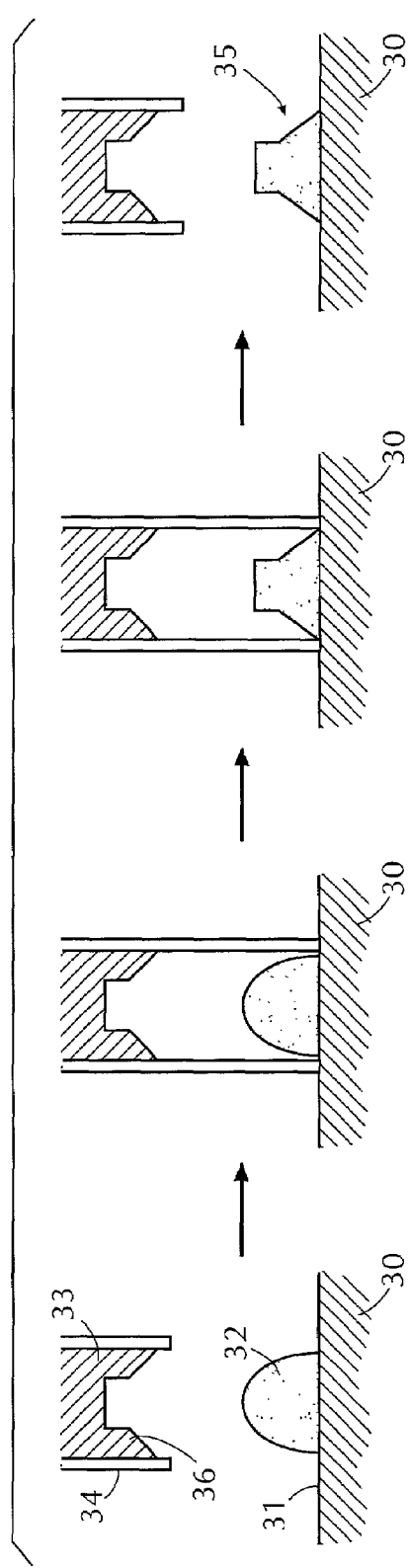
FIG. 4 is a schematic sectional side view of a forming method according to an embodiment of the present invention.

Referring to FIG. 4, according to yet another embodiment of the present invention, an edible mass 32 is deposited onto a deposit surface 31 of a substrate 30. A containment member 34 is brought into contact with deposit surface 31 to bound edible mass 32. Forming member 33 having a chilled contacting surface 36 is contacted to edible mass 32, thereby at least partially solidifying an outer surface layer of edible mass 32 to form a shaped edible product 35. In this embodiment, containing member 34 prevents edible mass 32 from overextending a preset boundary. Containing member 34 need not be in contact with edible mass 32 prior to the action of forming member 33.

In the above example, the action of the forming member can stop short of the forming member contacting the deposit surface.

It is preferred that containing member 34 be chilled. Otherwise, the process time is lengthened. It is preferred that containing member 34 is chilled to below about 10° C., more preferably to below about 0° C., even more preferably below about −15° C. The temperature of containing member 34 can be different from the temperature of chilled contacting surface 36. If containing member 34 is chilled, the contact time should be controlled to avoid excessive solidification of edible mass 32 prior to the action of forming member 33.

Figure 5:
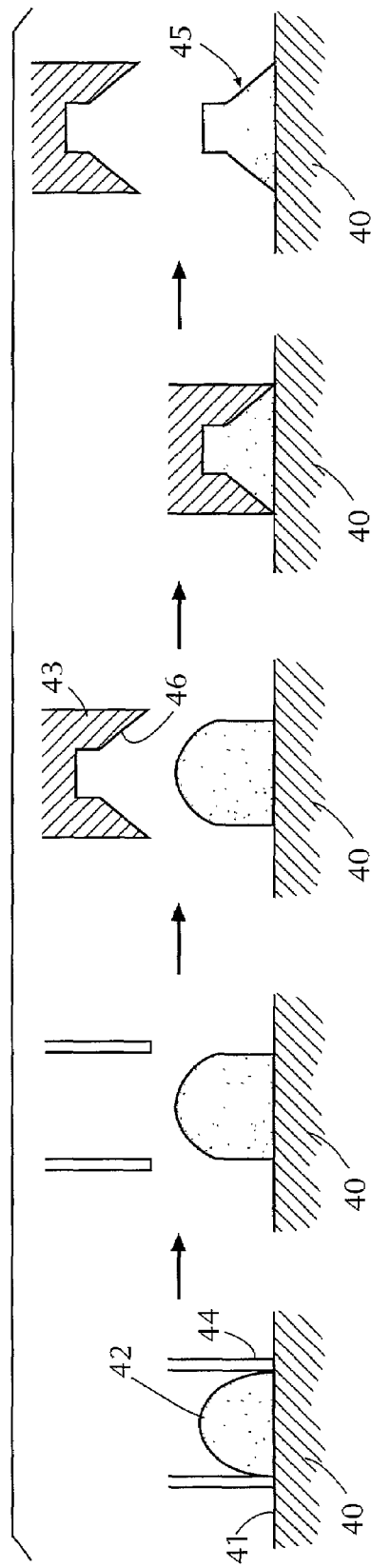
FIG. 5 is a schematic sectional side view of a forming method according to an embodiment of the present invention.

Referring to FIG. 5, according to an embodiment of the present invention, a containment member 44 is brought into contact with a deposit surface 41, of a substrate 40, to bound an edible mass 42. Edible mass 42 is deposited onto deposit surface 41 and bound by containment member 44. Containment member 44 is removed, and a forming member 43 having a chilled contacting surface 46 is contacted to edible mass 42, thereby at least partially solidifying an outer surface layer of edible mass 42 to form a shaped edible product 45.

In the above example, the action of the forming member can stop short of the forming member contacting the deposit surface.

It is preferred that containing member 44 be chilled. Otherwise, the process time is lengthened. It is preferred that containing member 44 is chilled to below about 10° C., more preferably to below about 0° C., even more preferably below about −15° C. The temperature of containing member 44 can be different from the temperature of chilled contacting surface 46. If containing member 44 is chilled, the contact time should be controlled to avoid excessive solidification of edible mass 42 prior to the action of forming member 43.

Figure 6:
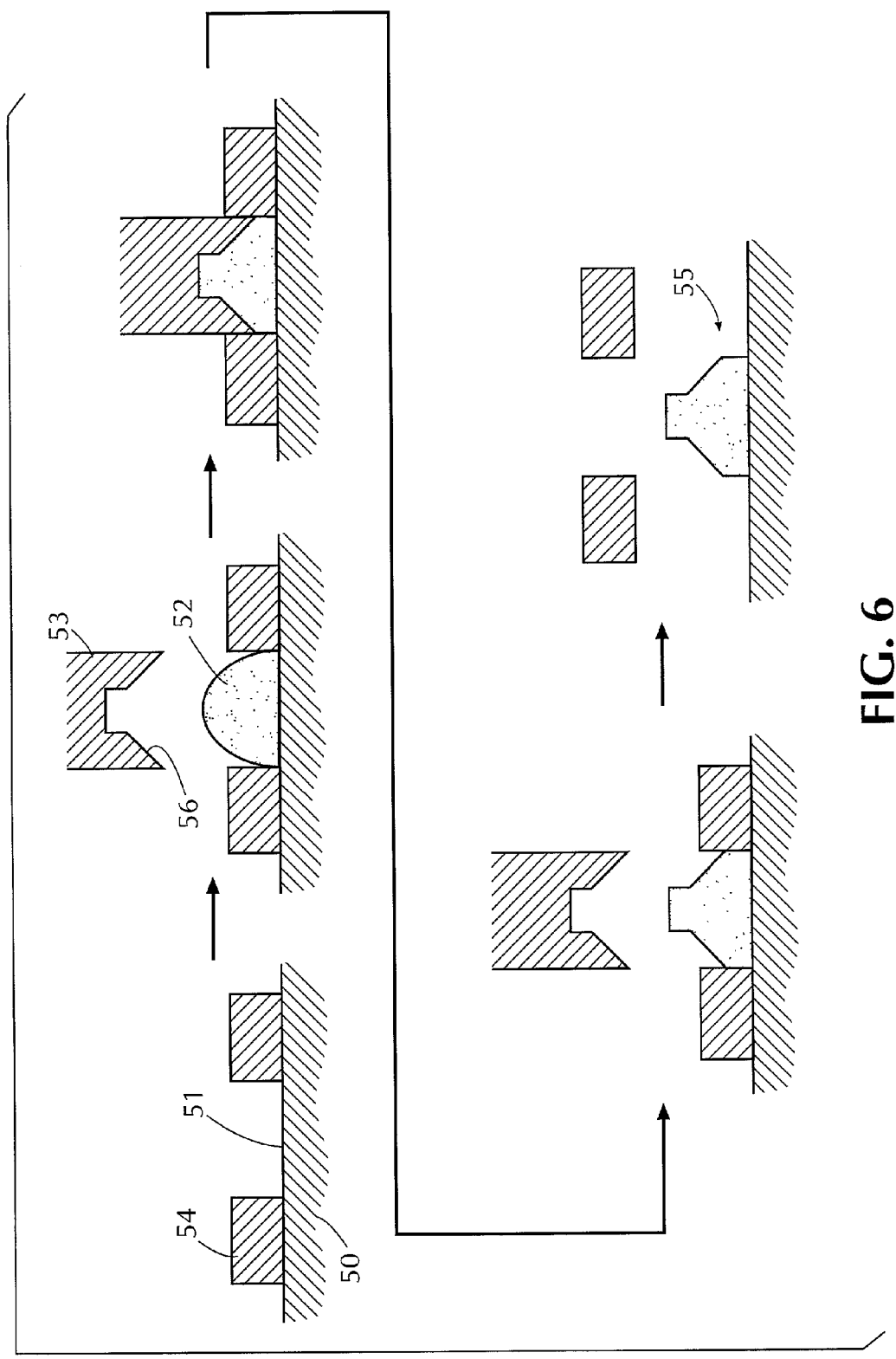
FIG. 6 is a schematic sectional side view of a forming method according to an embodiment of the present invention.

Referring to FIG. 6, according to another embodiment of the present invention, a containment member 54 is brought into contact with a deposit surface 51, of a substrate 50, to bound an edible mass 52. Edible mass 52 is deposited onto deposit surface 51 and bound by containment member 54. A forming member 53 having a chilled contacting surface 56 is contacted to edible mass 52, thereby at least partially solidifying an outer surface layer of edible mass 52 to form a shaped edible product 55.

In the above example, the action of the forming member can stop short of the forming member contacting the deposit surface.

It is preferred that containing member 54 be chilled. Otherwise, the process time is lengthened. It is preferred that containing member 54 is chilled to below about 10° C., more preferably to below about 0° C., even more preferably below about −15° C. The temperature of containing member 54 can be different from the temperature of chilled contacting surface 56. If containing member 54 is chilled, the contact time should be controlled to avoid excessive solidification of edible mass 52 prior to the action of forming member 53.

Figure 7:
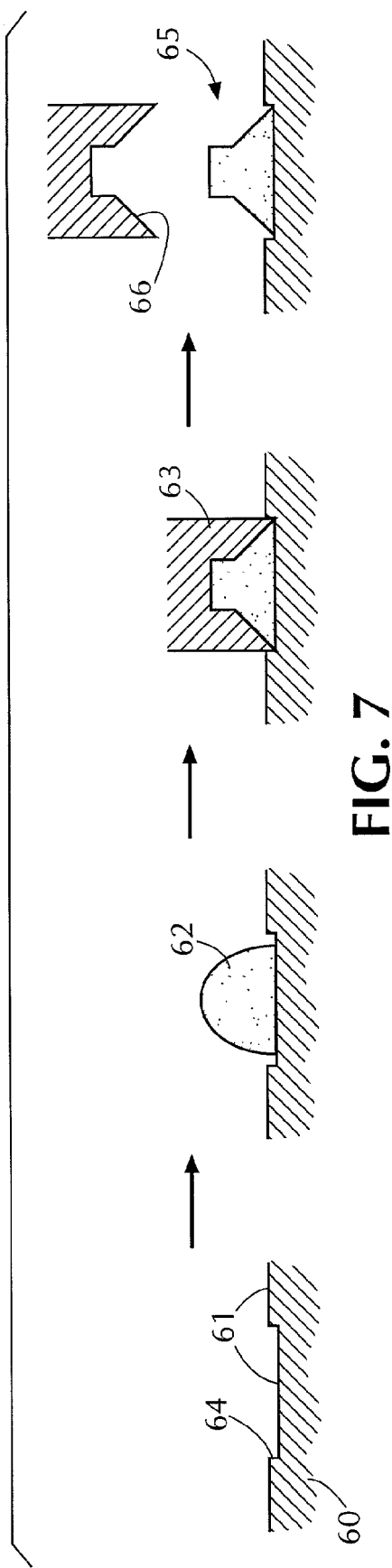
FIG. 7 is a schematic sectional side view of a forming method according to an embodiment of the present invention.

Referring to FIG. 7, according to another embodiment of the present invention, a deposit surface 61 of a substrate 60 includes a recess 64. An edible mass 62 is deposited onto deposit surface 61 such that edible mass 62 is bound by recess 64 and extends above deposit surface 61. A forming member 63 having a chilled contacting surface 66 is contacted to edible mass 62, thereby at least partially solidifying an outer surface layer of edible mass 62 to form a shaped edible product 65. In this case, recess 64 serves to contain edible mass 62 to prevent edible mass 62 from extending beyond a predetermined boundary. In another embodiment, not shown, recess 64 can serve to impede the flow of edible mass 62 during the action of forming member 63, thereby preventing shaped edible product 65 from extending beyond a predetermined boundary.

Figure 8:
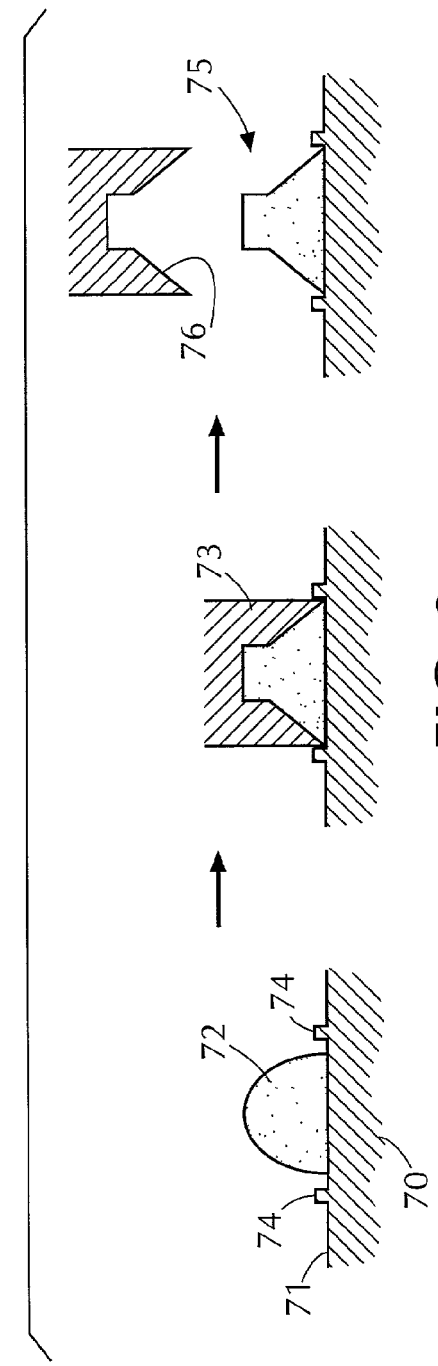
FIG. 8 is a schematic sectional side view of a forming method according to an embodiment of the present invention.

Referring to FIG. 8, according to an embodiment of the present invention, a deposit surface 71 of a substrate 70 includes a ridge 74. An edible mass 72 is deposited onto deposit surface 71 such that edible mass 72 is bound by ridge 74 and extends above deposit surface 71. A forming member 73 having a chilled contacting surface 76 is contacted to edible mass 72, thereby at least partially solidifying an outer surface layer of edible mass 72 to form a shaped edible product 75. In this case, ridge 74 serves to contain edible mass 72 to prevent edible mass 72 from extending beyond a predetermined boundary. There can be a multitude of ridges. The ridges can be of any convenient shape and geometry.

Figure 9A:
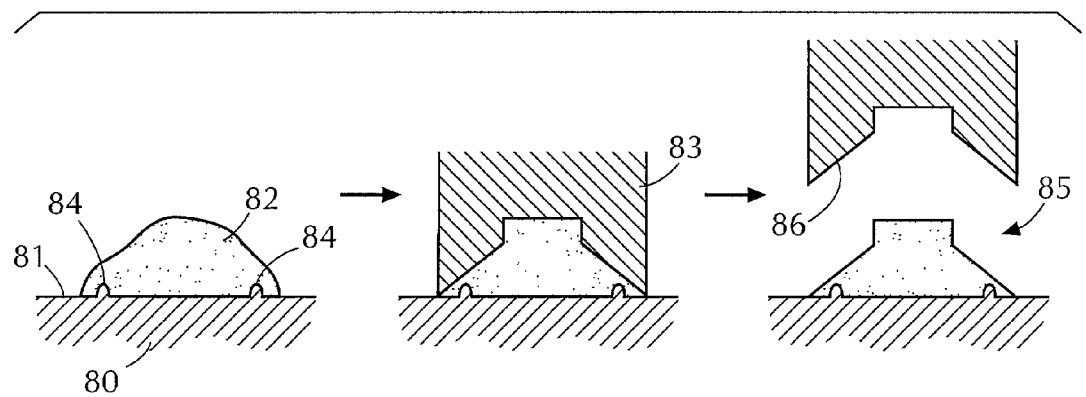
FIG. 9A is a schematic sectional side view of a forming method according to an embodiment of the present invention.

In another embodiment, referring to FIG. 9A, a deposit surface 81 of a substrate 80 includes a ridge 84. An edible mass 82 is deposited onto deposit surface 81 such that the flow of edible mass 82 is impeded by ridge 84 and edible mass 82 extends above deposit surface 81. A forming member 83 having a chilled contacting surface 86 is contacted to edible mass 82, thereby at least partially solidifying an outer surface layer of edible mass 82 to form a shaped edible product 85. In this case, ridge 84 serves to impede the flow of edible mass 82 during the action of forming member 83, thereby preventing shaped edible product 85 from extending beyond a predetermined boundary.

Figure 9B:
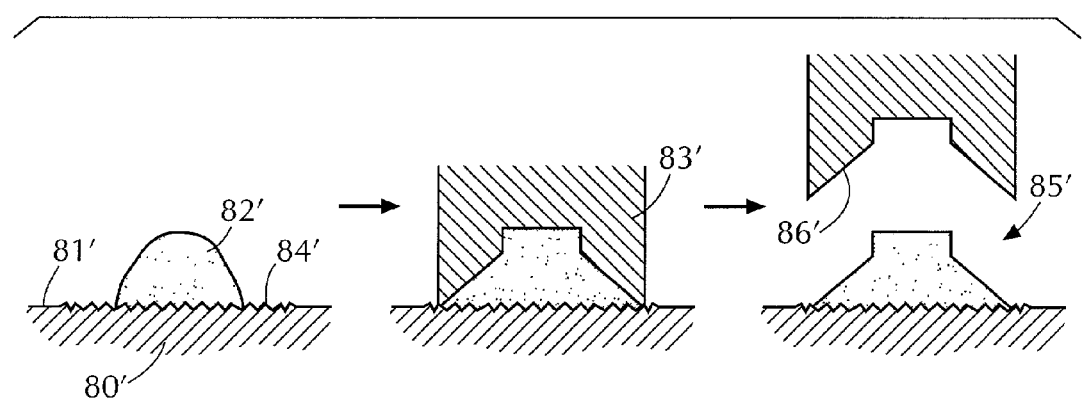
FIG. 9B is a schematic sectional side view of a forming method according to an embodiment of the present invention.

Referring to FIG. 9B, in an embodiment of the present invention, a deposit surface 81' of a substrate 80' includes a textured surface 84'. An edible mass 82' is deposited onto deposit surface 81' such that the flow of edible mass 82' is impeded by textured surface 84' and edible mass 82' extends above deposit surface 81'. A forming member 83' having a chilled contacting surface 86' is contacted to edible mass 82', thereby at least partially solidifying an outer surface layer of edible mass 82' to form a shaped edible product 85'. In this case, textured surface 84' serves to impede the flow of edible mass 82' during the action of forming member 83', thereby preventing shaped edible product 85' from extending beyond a predetermined boundary.

Figure 9C:
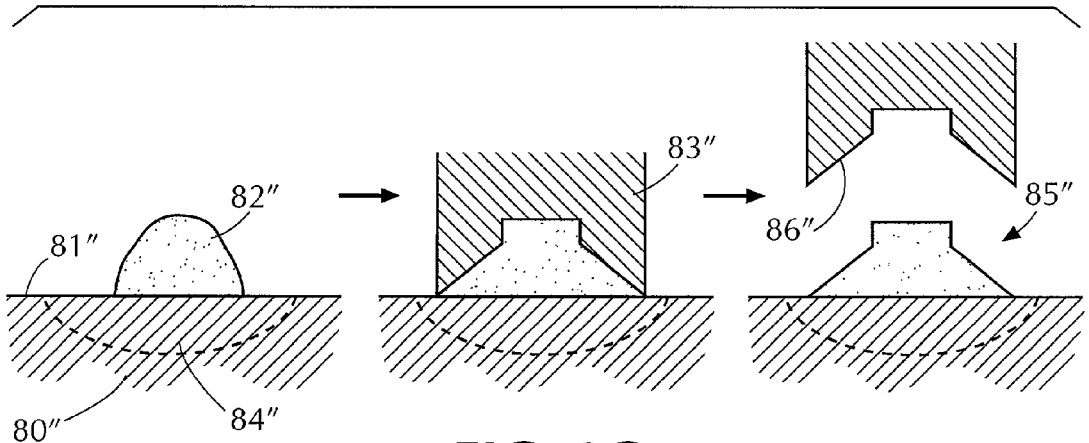
FIG. 9C is a schematic sectional side view of a forming method according to an embodiment of the present invention.

Referring to FIG. 9C, in another embodiment of the present invention, a deposit surface 81" of a substrate 80" includes a chilled portion 84". An edible mass 82" is deposited onto deposit surface 81" such that the flow of edible mass 82" is impeded by chilled portion 84" and edible mass 82" extends above deposit surface 81". A forming member 83" having a chilled contacting surface 86" is contacted to edible mass 82", thereby at least partially solidifying an outer surface layer of edible mass 82" to form a shaped edible product 85". In this case, chilled portion 84" serves to impede the flow of edible mass 82" during the action of forming member 83" because the cooler temperature of chilled portion 84" partially sets edible mass 82" and slows the flow of edible mass 82" during the action of forming member 83", thereby preventing shaped edible product 85" from extending beyond a predetermined boundary.

Referring to FIG. 10A, according to an embodiment of the present invention, at least two containment members 94a and 94b are brought into contact with a deposit surface 91, of a substrate 90, to bound an edible mass 92. Edible mass 92 is deposited onto deposit surface 91 and bound by containment members 94a and 94b. Containment members 94a and 94b include topological features 97a and 97b respectively. A forming member 93 having a chilled contacting surface 96 is contacted to edible mass 92, thereby at least partially solidifying an outer surface layer of edible mass 92 to form a shaped edible product 95. Topological product features 98 are formed correspondingly to topological features 97a and 97b.

It is preferred that containing members 94a and 94b be chilled. Otherwise, the process time is lengthened. It is preferred that containing members 94a and 94b are chilled to below about 10° C., more preferably to below about 0° C., even more preferably below about −15° C. The temperature of containing members 94a and 94b can be different from the temperature of chilled contacting surface 96. If containing members 94a and 94b are chilled, the contact time should be controlled to avoid excessive solidification of edible mass 92 prior to the action of forming member 93.

Referring to FIG. 10B, according to another embodiment of the present invention, at least two containment members 94a' and 94b' are brought into contact with a deposit surface 91', of a substrate 90', to bound an edible mass 92'. Edible mass 92' is deposited onto deposit surface 91' and bound by containment members 94a' and 94b'. Containment members 94a' and 94b' each include an undercutting feature 99. A forming member 93' having a chilled contacting surface 96' is contacted to edible mass 92', thereby at least partially solidifying an outer surface layer of edible mass 92' to form a shaped edible product 95'. Extending overhang portions 100 are formed correspondingly to undercutting feature 99.

It is preferred that containing members 94a' and 94b' be chilled. Otherwise, the process time is lengthened. It is preferred that containing members 94a' and 94b' are chilled to below about 10° C., more preferably to below about 0° C., even more preferably below about −15° C. The temperature of containing members 94a and 94b can be different from the temperature of chilled contacting surface 96'. If containing members 94a' and 94b' are chilled, the contact time should be controlled to avoid excessive solidification of edible mass 92' prior to the action of forming member 93'.

The substrate can be any convenient supporting material such as, for example, rubber, polymer, metal, paper, inorganic, or organic material. The substrate can be an edible composition. The substrate can be stationary, moving, or intermittently moving. The substrate can be a movable component such as, for example, a belt, tray, sheet, wheel, cog, cam, or follower. The deposit surface, can be any convenient surface including, for example, a surface of a product intermediate or of a non-edible container.

The action of the containing member, containing feature, flow impeding member, or flow impeding feature can occur before, during, or after the edible mass is deposited onto the deposit surface. Further, the action of the containing member, containing feature, flow impeding member, or flow impeding feature can occur before or during the action of the forming member.

The containing member and the forming member can each be composed of more than one part or component. Such parts or components can be connected to each other movable, slidably, and/or rotatably, by any convenient means such as, for example, by hinges, pins, channels, resilient portions, memory portions, environmentally responsive portions, springs, mating portions, etc. Each component can be any convenient shape, made of any convenient material. As shown by FIGS. 10A and 10B, such multicomponent members allow topological features to be formed/shaped or embossed which would be unavailable from a single component member.

The point of contact of the containing member with the surface can include any convenient seal such as, for example, a resilient portion, gasket, mating portion, O-ring, or gland. The seal can be at the end of the containing member proximate to the surface that the containing member contacts, on the surface itself, or on both. The seal can be complete in order to completely bound the deposited edible mass, or the seal can be partial. If the seal is partial, the containing member serves to impede the flow of the edible mass, during the action of the forming member, effective to limit the product of the action of the forming member to a predetermined bound.

In general, the deposited edible mass extends above the deposit surface. If the edible mass is deposited into a recess volume, the edible mass extends above the depth of the recess in order to extend above the deposit surface. It is only necessary for the deposited edible mass to extend above the region of the deposit surface proximate to the edible mass; that is, the edible mass need not extend above a surface feature of the deposit surface located at a distance, from the edible mass, which does not affect the relationships between the forming member, the edible mass, the deposit surface, and any containment means.

In general, it is preferable to control humidity in order to control the dew point to avoid or control condensation on the forming member and on the containing member when chilled. The containing member and/or the forming member can be insulated, although such insulation is not required.

In general, any surface described above can be selected, or modified to have a surface energy effective to promote release.

The containing member can include more than one surface and can include more than one vertex. The containing member can operate in concert with the forming member to produce various three dimensional effects such as an undercut to the edible product. The containing member can operate to cause three dimensional features on the edible product.

In general, in all of the above cases, the flow of the edible mass can be controlled as described. However, in addition, the rheology of the edible mass can be controlled in order to limit the flow of the deposited edible mass. The yield value can be controlled, as is known to one of ordinary skill in the art be any convenient method such as, for example, by aeration or by modification of the emulsifier or fat content. In fact, FIG. 9C demonstrated how cooling affects the yield value effective to control the flow of the edible mass.

EXAMPLES

The following examples are illustrative of some of the products and methods of making the same falling within the scope of the present invention. They are, of course, not to be considered in any way limitative of the invention. Numerous changes and modification can be made with respect to the invention.

Example 1

A milk chocolate composition is prepared using the formulation in Table 1-A below:

TABLE 1-A

| Milk Chocolate Formulation | |
|---|---|
| Sugar | 50.00% |
| Cocoa Butter | 20.49% |
| Whole Milk Powder | 18.00% |
| Chocolate Liquor | 11.00% |
| Lecithin | 0.50% |
| Vanillin | 0.01% |

The chocolate mixture is refined to reduce the solid particle sizes to 25 microns (by micrometer) and then loaded into a Petzholdt Conge. The chocolate is dry conged for 6 hours after which lecithin is added. The chocolate is then spun in the conge for 30 minutes. The conged chocolate is transferred into a tank where additional lecithin and cocoa butter are added (standardization) to achieve an apparent viscosity of 20,000 cps at 45° C. The standardized chocolate is then tempered in a continuous Sollich Solltemper-Turbo Model MSV3000 where the chocolate is cooled from 45° C. to 28° C. with aggressive shear to produce cocoa butter crystals of stable and unstable polymorphs. The tempered chocolate is warmed slightly in the last section of the Solltemper to 31° C. to melt out unstable crystals. The tempered chocolate is at 31° C. and has a temper level of 6 CTU (° F.) and −0.5 slope as determined by Tricor Termermeter Model 501. The chocolate is then pumped to the enrober.

The centers to be coated with chocolate have a chewy nougat bottom layer and soft caramel top layer. The nougat has composition set forth in Table 1-B (below) and is prepared by the method described in Minifie, 3rd Edition, pg. 578–580.

TABLE 1-B

| Chewy Nougat Formulation | |
|---|---|
| Egg Albumen | 0.37% |
| Sugar | 43.22 |
| Glucose Syrup | 36.63% |
| Water | 19.78% |

The caramel composition is set forth in Table 1-C prepared in the manner similar to that described in Minifie, 3rd Ed., pp 533–537.

TABLE 1-C

| Soft Caramel Formulation | |
|---|---|
| Corn Syrup | 40.00% |
| Sweetened Cond. Whole Milk | 37.40% |
| Sugar | 13.50% |
| Milk Butter | 5.19% |
| Water | 3.40% |
| Salt | 0.50% |
| Flavorings | 0.01% |

The caramel/nougat centers have an average temperature of 24° C. at time of enrobing. The caramel/nougat centers comprise a nougat layer (10 mm thick) and a caramel layer (4 mm thick) applied onto the top surface of the nougat. The overall size of the center is 14 mm high and 20 mm square.

The centers are coated with tempered milk chocolate in a continuous enrober as described in Minifie, 3rd Ed., pages 216–218. The amount of chocolate enrobed onto the center is 35% by weight of the total finished chocolate confection with an average thickness of about 2 mm.

The enrobed centers coated with liquid tempered chocolate are transferred from the wire belt to a solid polyurethane coated belt which passes into a temperature and humidity controlled embossing zone maintained at a temperature of 31° C. and a dewpoint of −24° C.

In the embossing zone, the belt passes over a rigid flat plate on which embossing occurs. The rigid flat plate is wide enough to support the belt and coated centers through the entire embossing cycle. The centers are aligned prior to entering the enrober and maintain the alignment through the discharge to present an orderly rank and file to the embossing section. The embosser is comprised of a refrigerated panel to which is affixed solidly, and with good heat transfer contact, an embossing plate comprised of designs upon a plane background (convex) or foreground (concave). The embossing plate, which may be readily interchanged with those of other designs, has a plurality of individual embossing regions for embossing individual confections. The embossing regions on the plate are decorated with a repeated pattern of protruding stars of diameters of 3, 4 and 5 mm. The refrigerated panel is cooled by glycol which has an operating temperature such that the exposed surface of the embossing plate is maintained at −20° C. The entire embosser assembly, that is the embossing plate and the refrigerated panel is mounted in a frame. The frame may be rapidly and precisely driven simultaneously in both the vertical (up and down), horizontal (with and against the direction of travel of the coated bars on the belt) and side-to-side (across the direction of travel for fine alignment adjustment) directions through the application of servo motor drive mechanisms. The embossing plate is wide enough to cover the width of the belt carrying the coated centers and contains a number of embossing regions enabling the simultaneous embossing of a multiplicity of products.

Starting the embossing cycle, the embossing assembly moves downward and/or horizontally such that upon contacting the tops of the coated centers there is no relative speed between the embossing plate and the coated centers. The embossing assembly travels with, and in contact with the chocolate on the tops of the coated centers for 1 second after which the embossing plate retracts and travels back to position to restart the cycle. The embossing plate is of sufficient dimension in the direction of travel to provide the contact time required to emboss the chocolate while allowing transit time to return to the beginning of the cycle. The embossed surface of the chocolate rewarms slightly due to heat transfer from the warmer lower layers of the chocolate and from the environment just prior to, and in, the cooling tunnel. This warming causes some of the fat which had been set as unstable crystals from the cold embossing in the chocolate surface layers to melt. This may be observed as a slight sheen on the embossed surface. This partial melting results in the slight softening of the surface, improving the finished gloss. The embossed, coated centers then enter a chocolate cooling tunnel.

The cooling tunnel is comprised of three sections. The first section comprises an environment with an air temperature of 17° C. with an average H-value of 35 w/m$^2$ ° C. The coated centers are carried by the conveyor belt over platens under the conveyor belt in the first section of the tunnel.

These platens are cooled to 15° C. by recirculating cooling media and set the chocolate on the bottoms of the coated centers so that the pieces release from the conveyor belt in 3 minutes to enable the transfer of the coated centers to the second cooling tunnel section belt. The second section of the tunnel has an operating temperature of 12° C. and an H-value of 35 w/m²° C. The coated centers are in the second section of the tunnel for 5 minutes. The last section of the tunnel is 2 minutes long and has an operating temperature of 18° C. and an H-value of 35 w/m²° C. to warm the surface of the set chocolate so that the surface is above the dewpoint of the environment upon exiting the tunnel. The total time in all three sections of the cooling tunnel is 10 minutes. The resultant finished chocolate confection exiting the tunnel has a fair to acceptable gloss, with some loss of detail due to the rewarm effect immediately after embossing.

Example 2

Caramel/nougat centers comprised as set forth in Example 1 are enrobed, embossed and cooled as set forth in Example 1 with the exception of the embossing plate contact time. In this example, the contact time is 3 seconds. The design detail is maintained better than Example 1 due to the reduced effect of the surface rewarm from the inner warmer portion due to the thicker layer of set chocolate created by the longer contact time. This reduces the subsequent flow of the embossed features. This results in a sharper design detail but only acceptable gloss.

Example 3

Centers comprised as set forth in Example 1 are enrobed, embossed and cooled as set forth in Example 1 with the exception of the embossing plate contact time. In this example, the contact time is optimized to 2.1 seconds. The optimized time for a given plate temperature is a function of, among many things, chocolate type, environmental conditions in the embossing zone and setting rate in the cooling tunnel. The optimized time results in the optimum design detail retention, while delivering acceptable gloss.

This is achieved by controlling the thickness of the set layer by varying either the contact time and/or surface temperature of the embosser. The optimized contact time results in a set layer that is thin enough to allow the inner warm portions to warm the fat within the set layer, thereby providing fat to be expressed on the surface and providing acceptable gloss, but low enough to prevent flow of the chocolate that would result in loss of detail. This optimization can be achieved without undue experimentation by simply varying the process parameters to provide the optimal combination of gloss and shape retention.

Example 4

Centers comprised as set forth in Example 1 are enrobed, and embossed as set forth in Example 1. The embossed coated centers then enter the cooling section of the tunnel. The environment in the tunnel is −15° C. with a dewpoint of −20° C. The average H-value above the belt in the tunnel is 125 w/m²° C. The conveyor belt rides on platens cooled by refrigerated liquid to a temperature of −15° C. The platens extend into the tunnel to the point where the coated centers and belt have been exposed to the cold platens for 1 minute. The remainder of the tunnel, 2 minutes, is not equipped with cooling platens. The total time on the cooling section of the tunnel is 3 minutes. Upon exiting the cooling section, the cooled coated centers release from the belt, transfer to another conveyor and then enter the rewarm zone. The rewarm zone has a controlled atmosphere of 10° C., with a dewpoint of −20° C. and an average H-value of 50 w/m²° C. The surface temperature of the finished chocolate confection is raised to 9° C., which is above the dewpoint of the environment at the exit of the rewarm zone. In comparison with Example 1, aggressive cooling reduces the effect of the surface rewarm and subsequent flow at the expense of less liquid fat on the surface. This results in improved detail with somewhat less gloss.

Example 5

Caramel/nougat centers comprised as set forth in Example 1 are enrobed, embossed and cooled as set forth in Example 3, with a contact time of 3 seconds to give good design detail. This generally results in only acceptable gloss. In order to optimize the balance of gloss to retention of design detail as described in Example 3, a step of active surface rewarm is added prior to the cooling tunnel. An air plenum delivering an H-value of 75 w/m²° C. with an air temperature of 31° C. for 10 seconds is interposed between the embossing and the cooling tunnel as set forth in Example 4. This combination allows for precise control of the factors effecting both gloss and design detail.

Example 6

The minimization of contact time provides an operational advantage in that the reduced contact time allows for either a smaller embossing assembly or longer recycle time (when the embossing assembly returns to start the embossing cycle) or an optimized combination of smaller plate and reduced return transit time. This example illustrates the impact of the variables on the required contact time.

Centers are enrobed as set forth in Example 1. The coated centers are embossed and cooled by a variety of conditions as set forth in Table 6-A Below:

TABLE 6-A

| Plate Temperature | Contact Time(sec) | Plenum Time @31° C. (sec) |
|---|---|---|
| −10° C. | 3.9 | 5 |
| −15° C. | 3.1 | 6 |
| −20° C. | 2.5 | 7 |
| −30° C. | 2.0 | 9 |
| −40° C. | 1.6 | 10 |

Cooling tunnel conditions are as set forth in Example 4.

Example 7

Centers are prepared, enrobed, embossed and cooled as set forth in Example 5. The pattern of the embosser plate, instead of a "wallpaper" type pattern without specific registration with the coated center, comprised two individual patterns on the surface of the embosser. The two patterns are embossed upon the coated centers such that the design is in registration. That is to say that, at the moment of contact of the embossing plate with the coated centers, the patterns are centered upon the coated centers. This example allows for resultant finished chocolate confections with multiple designs with gloss and design detail similar to molded chocolate confections from an enrobing production line.

Example 8

Caramel/nougat centers are formed comprising a nougat layer (11 mm thick) and a caramel layer (5 mm thick) applied onto the top surface of the nougat. The overall size of the center is 100 mm long by 25 mm wide by 16 mm high. The centers are coated with tempered milk chocolate in a continuous enrober as described in Minifie, 3rd Ed., pages 216–218. Enrobing is carried out such that the excess chocolate is removed predominantly by shaking rather than impingement blowers. This results in a coating which preferentially remains on the tops of the centers. The amount of chocolate enrobed onto the center is 35% by weight of the total finished chocolate confection with an average side and bottom thickness of about 2 mm and a top thickness of about 3 mm.

The enrobed centers coated with liquid tempered chocolate are transferred from the wire belt to a solid polyurethane coated belt which passes into a temperature and humidity controlled embossing zone maintained at a temperature of 34° C. and a dewpoint of −24° C. The coated centers are embossed by an embossing assembly comprising a refrigerated panel and decorated plate as set forth in Example 1 and controlled in register as set forth in Example 7. The refrigerated panel is cooled by Syltherm® (a silicon oil) such that the embossing surface of the decorated panel is maintained at a temperature of −34° C. Ice tends to deposit on the embossing surface but is substantially removed each cycle through contact with the warm chocolate. Although ice may build up on the non-insulated, non-contact surfaces of the panels, this is minimized by design of the refrigerated plate and decorated plate. The design on the embosser face provides for deeper detail which is accommodated by the thicker chocolate layer on the tops of the centers. The dimensions of the internal radii of the design are critical for the good release from the embosser. It is believed sharp corners are to be avoided and all radii should be 1.5 mm or greater. In addition, right angles to the face of the embosser should be avoided. Release angles of about 8° or greater are sufficient. The chocolate is contacted for approximately 2 to 3 seconds depending upon chocolate type and temper and the exact design on the embosser surface. After embossing, the surface of the embossed chocolate is warmed for 5 to 15 seconds with air at a temperature of 34° C. and an H-value of 90 w/m²° C. The embossed coated centers then enter a cooling tunnel as set forth in Example 4. The finished chocolate confection has a high detail, deep relief design with acceptable gloss.

Example 9

Centers are prepared and enrobed as in Example 1. The coated centers enter a cooling tunnel as set forth in Example 4. The embossing section is positioned immediately or up to 20 seconds after the tunnel entrance. A roller or wheel is positioned over rigid cooling platens. The cooling platens set the bottoms of the coated center as well as provide support for the embossing operation. The roller is adjustable up-and-down to accommodate a variety of product heights, is chilled internally or by the tunnel environment and driven such that the surface speed of the wheel matches that of the coated centers. The chilled roller is decorated in a manner similar to the embossing plate set forth in Example 1 except that the design wraps around the circumference of the roller. The embossing section in the cooling tunnel is positioned such that the chocolate is partially set but remains fluid enough to allow induced flow or forming. Alternatively, the chocolate, if set, may be rewarmed by active surface rewarm as set forth in Example 5 prior to embossing. As the embossing section is in a cooled environment and the chocolate is partially set, the required contact time is reduced which allows the use of a wheel or roller with a necessarily limited contact time to form the design. If necessary, the embossed design on the coated centers may be rewarmed by air or heaters as set forth in Example 5 internal to the tunnel. This is obviously at the expense of energy efficiency. The embossed centers then continue in the tunnel as set forth in Example 4 with operating conditions of −20° C., H-value of 110 w/m²° C. for a total residence time of 3 minutes. The finished chocolate confection has good detail of design with acceptable gloss.

Example 10

Caramel/nougat centers are prepared enrobed and embossed as set forth in Example 1 except that the embosser surface temperature is operated at 9° C. In this example, with the stated embosser temperature, satisfactory release of the chocolate from the embosser may only be accomplished with contact times in excess of 10 or 20 seconds dependent upon chocolate type, temper, embosser material and design, and environmental conditions. Release is attempted in 10 seconds, and sufficient solidification has not occurred in the chocolate to allow release from the surface of the embosser. The attempted release results in any or all of the following: detrimental chocolate surface disruption, severe build-up of chocolate on the embosser plate leading to jams and pick-up of the product from the belt partially or completely thereby causing further jams of the mechanism.

Example 11

A milk chocolate composition is prepared using the formulation in Table 11-A below:

TABLE 11-A

| Milk Chocolate Formulation | |
|---|---|
| Sugar | 50.00% |
| Cocoa Butter | 20.49% |
| Whole Milk Powder | 18.00% |
| Chocolate Liquor | 11.00% |
| Lecithin | 0.50% |
| Vanillin | 0.01% |

The chocolate mixture is refined to reduce the solid particle sizes to 25 microns (by micrometer) and then loaded into a Petzholdt Conge. The chocolate is dry conged for 6 hours after which lecithin is added. The chocolate is then spun in the conge for 30 minutes. The conged chocolate is transferred into a tank where additional lecithin and cocoa butter are added (standardization) to achieve an apparent viscosity of 20,000 cps at 45° C. The standardized chocolate is then tempered in a continuous Sollich Solltemper-Turbo Model MSV3000 where the chocolate is cooled from 45° C. to 28° C. with aggressive shear to produce cocoa butter crystals of stable and unstable polymorphs. The tempered chocolate is warmed slightly in the last section of the Solltemper to 31° C. to melt out unstable crystals. The tempered chocolate is at 31° C. and has a temper level of 6 CTU (° F.) and −0.5 slope as determined by Tricor Tempermeter Model 501.

The tempered chocolate is then deposited in 7 g portions onto a continuously moving thin plastic belt (Burrell Polycool PC4) in a uniform pattern of rows and columns. There are 40 portions across the belt and 5 portions per deposit in the direction of travel for a total of 200 portions per deposit. The depositor operates repeatedly so that a continuous pattern of portions is deposited on the belt. The chocolate portions are then transported on the belt to the forming section. The portions are roughly flattened spheres as there is some settling in transit. The forming section is located in a controlled environment with a temperature of −21° C. and a dewpoint of −24° C. The belt rides on a rigid flat plate which supports the portions during the forming step. The plate may be cooled as necessary to set the bottoms in the manner set forth for the cooling tunnel platens in Example 1 (15° C.) and 4 (−15° C.). The forming assembly is comprised of multiple refrigerated forming heads in positions corresponding to the configurations and location of the chocolate portions deposited on the belt by the depositor. The forming heads are decorated in a manner similar to that set forth in Example 8. The exposed surface of the forming heads is maintained at −20° C. The forming heads are mounted in a frame. The frame may be rapidly and precisely driven simultaneously in both the vertical (up and down), horizontal (with and against the direction of travel of the coated bars on the belt) and side-to-side (across the direction of travel for fine alignment adjustment) directions through the application of servo motor drive mechanisms.

Starting the forming cycle, the forming heads move downward and/or horizontally such that upon contacting the coated centers there is no relative speed between the embossing plate and the coated centers. The forming head goes beyond contacting the top surface and continues in such a manner to cause the sides of the chocolate portions to be formed in a manner similar to the tops. The forming head descends to a point 2–3 mm above the belt. Excess deposited chocolate, if any, extrudes from the edges of the forming head. Excess chocolate should be used since a lack of chocolate causes unwanted voids in the formed piece. The forming heads travel with and are in contact with the chocolate on the tops and sides of the coated centers for about 2 seconds after which the forming heads plate retracts and travel back to position to restart the cycle. The forming heads are of a number that is sufficient to provide the contact time required while allowing transit time to return to the beginning of the cycle. The formed chocolate portions are then rewarmed as set forth in Example 5 as necessary to provide optimum gloss and detail and cooled in a cooling tunnel as also set forth in Example 5. The finished solid chocolate confection has good detail of design with acceptable gloss.

Example 12

Chocolate is prepared and tempered as set forth in Example 11. A peanut butter containing cream is prepared and deposited onto the belt as in Example 11 simultaneously with the tempered chocolate in the manner set forth in Minifie, 3rd Ed. Pg. 204. These portions are then formed in the manner set forth in Example 11 into the shape of an truncated cone with side release angle of 20° and where the height is 12 mm and the diameter is 50 mm. The formed center filled chocolate portions are then cooled in the manner as set forth in Example 11. The finished peanut butter filled chocolate confection has acceptable gloss and is resistant to bloom formation due to the final rapid cooling.

Example 13

Portions are deposited or co-deposited as in Example 11 or 12. For each individual deposit, prior to the forming head coming in contact with the deposited portion, a chilled sleeve at a temperature of −20° C. which completely surrounds the forming head first contacts the belt and encompasses the entire individual deposited portion. This effectively traps the deposited portion, preventing the extrusion of excess deposit as set forth in Example 11. The sleeve contacts the belt 0.5 seconds prior to the first contact of the forming head and remains in position during the forming cycle. The motion of the sleeve is either driven, by servo motor for example, or is sprung loaded and attached to the forming head directly and driven thereby. The finished deposited, formed confection has no excess chocolate rim or flash as is possible in the method set forth in Example 11.

Example 14

The rheology of tempered chocolate causes difficultly in achieving accurate deposits. Highly accurate deposits, highly accurate being defined as variation of less than 0.1% by volume, of portions are made, as set forth in Example 11. The forming heads descend to the point of touching the belt and form the deposits completely without the formation of a rims or voids.

Example 15

Deposits are made as set forth in Examples 11, 12, 13 or 14. The belt stops during the deposit and forming cycle in the manner known as "indexing". The forming heads move up and down and the motion in the direction of travel is stopped during the forming cycle. In this manner, the motions of the forming heads in minimized.

Example 16

Deposits are made in the manner as set forth in Example 12. The center material is mixture of fats and sugars known as a white cream filling. The deposited portions are formed in the manner as set forth in Example 11. The forming heads are shaped such that the formed deposited portion is in the shape of a half egg. The formed deposited portion is then cooled in a tunnel in the manner as set forth in Example 1.

Example 17

Caramel and nougat centers are formed into the shape of a half egg with the nougat layer below the caramel layer. The overall dimensions are 50 mm long, 17 mm high at the peak and 35 mm wide at the widest point. The centers are then enrobed in a manner similar to that set forth in Example 8 with the majority of the excess chocolate removed by shaking. Impingement blowers used on the top of enrobed centers with non-planar top surfaces such as eggs may result in thin tops. The coated centers are then embossed as set forth in Example 5. The embossed coated centers are then cooled in a tunnel as set forth in Example 4.

Example 18

Caramel/nougat centers are prepared, enrobed and embossed as set forth in Example 11. The embosser is operated at a temperature of 6° C. and a contact time of 11 seconds. This is sufficient for release. The embossed coated centers are then cooled in a tunnel as set forth in Example 4.

The above description of the invention is intended to be illustrative and not limiting. Various changes or modifications in the embodiments described may occur to those skilled in the art. These can be made without departing from the spirit or scope of the invention.

What is claimed is:

1. A method of embossing a chocolate confection comprising the step of contacting the top outer surface of a chocolate composition, containing a liquid fat phase, with a chilled embossing member having a contacting surface temperature below 10° C. to form an embossed image or design in the top surface of the chocolate confection, without using a mold.

2. The method of claim 1, wherein said embossing member has a contacting surface temperature less than 5° C.

3. The method of claim 1, wherein said embossing member has a contacting surface temperature less than 0° C.

4. The method of claim 1, wherein said embossing member has a contacting surface temperature less than −5° C.

5. The method of claim 1, wherein said embossing member has a contacting surface temperature less than −10° C.

6. The method of claim 1, wherein said embossing member has a contacting surface temperature less than −15° C.

7. The method of claim 1, wherein said embossing member has a contacting surface temperature less than −25° C.

8. The method of claim 1, wherein said embossing member forms an embossed image on said surface.

9. The method of claim 8, wherein said embossed image contains printed matter.

10. The method of claim 1, wherein said chocolate composition is enrobed onto an edible center prior to said step of contacting with said embossing member.

11. The method of claim 1, wherein said chilled embossing member is contacted with said chocolate surface for a period of time sufficient to form an outer solidified chocolate skin sufficiently thick to retain shape after removal of said embossing member.

12. The method of claim 1, wherein said embossed surface is subsequently warmed by external means to obtain a surface gloss of 150 or greater.

13. The method of claim 1, wherein said embossing member has a contacting surface coated with a material effective to promote release.

14. The method of claim 1, wherein said step of contacting has a contacting time less than 1.5 minutes.

15. The method of claim 14, wherein said contacting time is less than 30 seconds.

16. The method of claim 14, wherein said contacting time is less than 10 seconds.

17. The method of claim 14, wherein said contacting time is less than 5 seconds.

18. The method of claim 14, wherein said contacting time is less than 3 seconds.

19. The method of claim 14, wherein said contacting time is less than 1 second.

20. The method of claim 14, wherein said contacting time is greater than 0.1 seconds.

* * * * *

UNITED STATES PATENT AND TRADEMARK OFFICE
CERTIFICATE OF CORRECTION

PATENT NO. : 7,223,428 B2 Page 1 of 1
APPLICATION NO. : 10/108478
DATED : May 29, 2007
INVENTOR(S) : Neil Willcocks et al.

It is certified that error appears in the above-identified patent and that said Letters Patent is hereby corrected as shown below:

COLUMN 6

Line 53, "eliminates" should read --eliminate--; and
Line 57, "Theological" should read --rheological--.

COLUMN 11

Line 11, "Theological" should read --rheological--; and
Line 31, "less" should read --fewer--.

COLUMN 13

Line 25, "thereof" should read --thereof.--.

COLUMN 20

Line 55, "be" should read --by--.

COLUMN 21

Line 44,   "Sugar     43.22"
        should read
  --Sugar     43.22%--.

COLUMN 28

Line 27, "a" should be deleted.

Signed and Sealed this

Twenty-eighth Day of August, 2007

JON W. DUDAS
*Director of the United States Patent and Trademark Office*